United States Patent [19]
Tuck et al.

[11] Patent Number: 6,115,698
[45] Date of Patent: *Sep. 5, 2000

[54] APPARATUS AND METHOD FOR TRADING ELECTRIC ENERGY

[75] Inventors: David Tuck, Woodstock, Ga.; Bruce Weier, Urbandale, Iowa; John Stojka, Dunwoody, Ga.

[73] Assignee: Continental Power Exchange, Inc., Atlanta, Ga.

[*] Notice: This patent issued on a continued prosecution application filed under 37 CFR 1.53(d), and is subject to the twenty year patent term provisions of 35 U.S.C. 154(a)(2).

[21] Appl. No.: 08/516,646

[22] Filed: Aug. 18, 1995

[51] Int. Cl.⁷ ............................. G06F 17/60; G06F 19/00
[52] U.S. Cl. .................................................. 705/37; 705/26
[58] Field of Search .................................. 395/207, 208, 395/237, 226, 227; 364/493, 528.21, 528.26; 705/7, 8, 37, 26, 27; 235/375, 377, 378, 376; 345/329, 330, 962; 707/1, 6, 10

[56] References Cited

U.S. PATENT DOCUMENTS

| | | |
|---|---|---|
| 3,173,002 | 3/1965 | Starr . |
| 3,229,110 | 1/1966 | Kleinbach et al. . |
| 3,683,161 | 8/1972 | Stadin et al. ............................. 364/493 |
| 3,719,809 | 3/1973 | Fink . |
| 3,740,572 | 6/1973 | Cohn ......................................... 307/57 |
| 3,913,829 | 10/1975 | Fink ......................................... 364/493 |
| 3,932,735 | 1/1976 | Giras ........................................ 364/493 |
| 4,320,306 | 3/1982 | Kohga ....................................... 307/51 |
| 4,568,934 | 2/1986 | Allgood ............................... 340/870.02 |
| 5,237,507 | 8/1993 | Chasek ................................ 364/464.22 |
| 5,297,031 | 3/1994 | Gutterman et al. ...................... 395/237 |
| 5,375,055 | 12/1994 | Togher et al. ........................... 395/237 |
| 5,394,324 | 2/1995 | Clearwater ............................... 395/208 |
| 5,592,375 | 1/1997 | Salmon et al. ........................... 395/207 |
| 5,621,654 | 4/1997 | Cohen et al. ............................ 364/493 |

OTHER PUBLICATIONS

Electric Power Trading Systems by Scott Spiewak, Cogen Power Marketing.
Dialog, File 621, Acc. # 00489621 ; PR Newswire "EDS Posts Record Earnings . . . "; 6 pages, Jul. 26, 1994.
Dialog File 669, Acc. # 00522416 ; Federal Action/Proposed Rules "Inquiry Concerning Alternative Power Pooling . . . "; 12 pages, Nov. 2, 1994.
Dialog File 148, Acc # 07609956 ; John P. Stojka "Automating the next–hour energy market . . . "; 7 pages, Nov. 1, 1994.
Dialog File 148, Acc. # 08098811 ; Jeff Mood, *PC Week* v. 12, n. 34, p. E1(2); "Pipe dreams . . . "; 6 pages, Aug. 28, 1995.
Dialog File 103, Acc # 03923072 ; "Wheeling in Canada", "*Transactions of the Engineering . . .* ", published 1991; pp. 1–23 by E.L. Fytche Only Abstract (2 pages), 1991.
Dialog File 635; Acc # 0455131: "Idealism and no deal . . . " by Mary Martin, Boston Globe, s. 1, p. 84, article (4 pages), Nov. 28, 1993.
Dialog File 148, Acc # 07190478: "EPACT Aftermath . . . " by Frank Bryant Energy User News, v. 19, n. 1, p. 1(3) (5 pages), Jan. 1994.
Dialog File 16, Acc # 05597504: "Power struggle . . . " Food Processing Jan. 1995, p. 51 by Pan Demetrakakes (4 pages).
Press Release — Nr. 1–Jan. 1998–Information bulletin from NORD POOI — The Nordic Power Exchange.

*Primary Examiner*—Joseph Thomas
*Attorney, Agent, or Firm*—David W. Carstens; Carstens, Yee & Cahoon, L.L.P.

[57] ABSTRACT

Electric energy can be traded between connected participants such as utility companies. The present method provides a common marketplace which provides participants the ability to display both buy and sell offers to the other participants. The marketplace also allows the participants to consummate a transaction for a quantity of electrical energy. The method further allows the participants to curtail transactions and the delivery of the electrical energy if necessary.

24 Claims, 29 Drawing Sheets

| | Review Contract Path Status Display for CILCO | | | |
|---|---|---|---|---|
| | Path (s-w-w-w-w-b) | Status | Start Date | End Date |
| 1 | ASSOC>OPPD>MDW>IIGE>IP>CWLP>CILCO | | | |
| 2 | CILCO>CWLP>IP>IIGE>MDW>OPPD>ASSOC | | | |
| 3 | CILCO>IP>IIGE>MDW>ISTATE>SJLP>LES | | | |
| 4 | LES>SJLP>ISTATE>MDW>IIGE>IP>CILCO | | | |
| 5 | CILCO>IP>IIGE>MDW>KCPL>ASSOC>EMPIRE | | | |
| 6 | EMPIRE>ASSOC>KCPL>MDW>IIGE>IP>CILCO | | | |
| 7 | CILCO>IP>IIGE>MDW>KCPL>EMPIRE>SWEPCO | | | |
| 8 | SWEPCO>EMPIRE>KCPL>MDW>IIGE>IP>CILCO | | | |
| 9 | ASSOC>NPPD>MDW>ISTATE>IIGE>IP>CILCO | | | |
| 10 | CILCO>IP>IIGE>ISTATE>MDW>NPPD>ASSOC | | | |
| 11 | CILCO>CIPS>IP>IIGE>ISTATE>KCPL>OPPD | | | |
| 12 | OPPD>KCPL>ISTATE>IIGE>IP>CIPS>CILCO | | | |
| 13 | BREC>SIPCO>CIPS>CWLP>IP>CILCO | | | |
| 14 | CILCO>IP>CWLP>CIPS>SIPCO>BREC | | | |

List Filters — Update List, Reset Filters
Seller: All, Link: All, Buyer: All, Path Status: All

Path Status: Valid (120), Starting Date: 5/4/95, Time: 10:41 am
Ending Date: 5/4/95, Time: 10:41 am
Update Path — 122

Close, Help

CIPS-Market Open
Please confirm transmission limits

| Interface Name | Max In | Max Out | Limit In | Limit Out |
|---|---|---|---|---|
| CILC | 400 | 200 | 150 | 200 |
| SIPC | 175 | 400 | 100 | 200 |
| IPC | 250 | 250 | 200 | 200 |
| CWLP | 375 | 200 | 300 | 200 |

0    126 — Confirm

---

CIPS-Market View Hour Ending: 900

Buy | Sell | Buy Market | Sell Market | Schedule
138  140   142          144           146

134

136

148

| B/S | MWh | N/I | Interface |
|---|---|---|---|

|  | MWhs | $ | PI |
|---|---|---|---|
| Buy | 0 | 0 | 100 |
| Sell | 0 | (0) | 150 |
| Net | 0 | 0 |  |
| Wheel | 0 | 0 | 100 |

● Text  ○ Graph MWh  ○ Graph $

300 In 0    0 Out 300

☐ CILC ☐
☐ CWLP ☐   152
☐ IPC ☐
☐ SIPC ☐

:02 | Transmission | Future Market | Reveal | ○ Current ● Next | Reports | Logout | Help
                                            130        132

FIG. 14

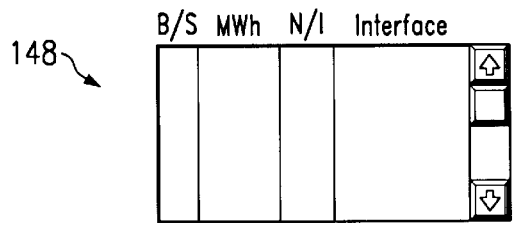
FIG. 15a
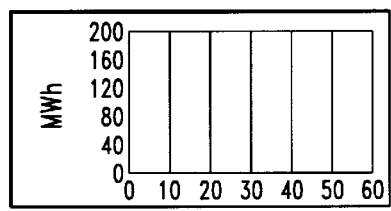
FIG. 15b
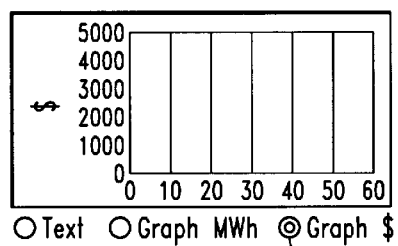
FIG. 15c
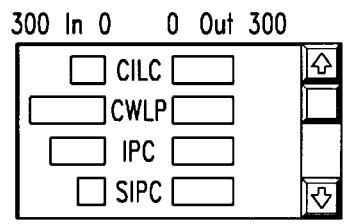
FIG. 15d
FIG. 15e

Future Markets Setup

Add Buy Offer:

| MWh | $/MWh | N/I |
|-----|-------|-----|
| 35  | 14.00 | I   |
| 50  | 13.25 | I   |

[Add] [Delete]

Transmission Service $//MWh:

| Interface | Interface | Cost |
|-----------|-----------|------|
| CILC | CWLP | 1.50 |
| CILC | IPC  | 2.00 |
| CILC | SIPC | 2.00 |
| CWLP | IPC  | 2.00 |
| CWLP | SIPC | 1.50 |
| IPC  | SIPC | 2.50 |

Add Sell Offer:

| MWh | $/MWh | N/I | Usage Fee |
|-----|-------|-----|-----------|
| 40  | 17.50 | I   |           |
| 40  | 17.50 | I   |           |
| 30  | 19.00 | I   |           |
| 85  | 28.00 | I   |           |

[Add] [Delete]

Transmission Limits MWh:

| Interface Name | Max In | Max Out | Limit In | Limit Out |
|----------------|--------|---------|----------|-----------|
| CILC | 400 | 400 | 150 | 250 |
| CWLP | 350 | 375 | 300 | 250 |
| IPC  | 500 | 500 | 250 | 250 |
| SIPC | 325 | 325 | 100 | 250 |

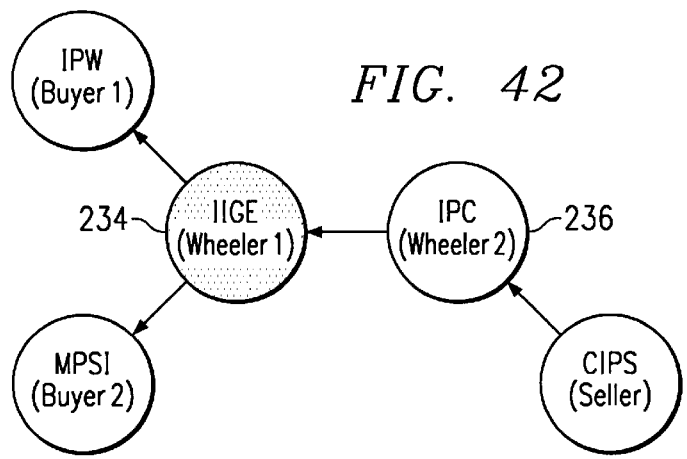
FIG. 42
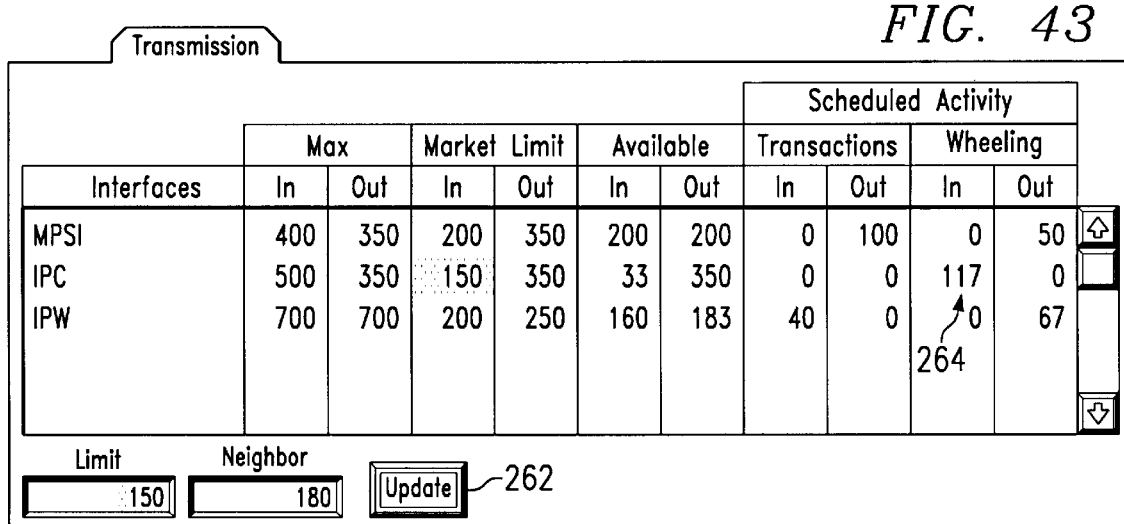
FIG. 43
FIG. 44

Acknowledge Curtail

The following transaction is curtailed for the Current Hour:

| B/S | MWh | $/MWh | Interface |
|---|---|---|---|
| Buy | 50 | 22.30 | IIGE |

Start Ramp at: 11:20
Ramp for: 0
Integrated:

| B/S | MWh | $ | Interface |
|---|---|---|---|
| Buy | 17 | 379.10 | IIGE |

[Acknowledge]

FIG. 49

Acknowledge Curtail

The following transaction is curtailed for the Current Hour:

| B/S | MWh | $/MWh | Interface |
|---|---|---|---|
| Buy | 67 | 23.55 | IIGE |

Start Ramp at: 11:20
Ramp for: 0
Integrated:

| B/S | MWh | $ | Interface |
|---|---|---|---|
| Buy | 22 | 518.10 | IIGE |

[Acknowledge]

FIG. 50

Acknowledge Failure

Please call:

Central Illinois Public Service Co.
(555) 662-5489

Immediately to inform them of curtailment of the following transaction:

| B/S | MWh | $/MWh | Interface |
|---|---|---|---|
| Buy | 50 | 22.30 | IIGE |

Acknowledge Failure

Please call:

Central Illinois Public Service Co.
(555) 662-5489

Immediately to inform them of curtailment of the following transaction:

| B/S | MWh | $/MWh | Interface |
|---|---|---|---|
| Buy | 67 | 23.55 | IIGE |

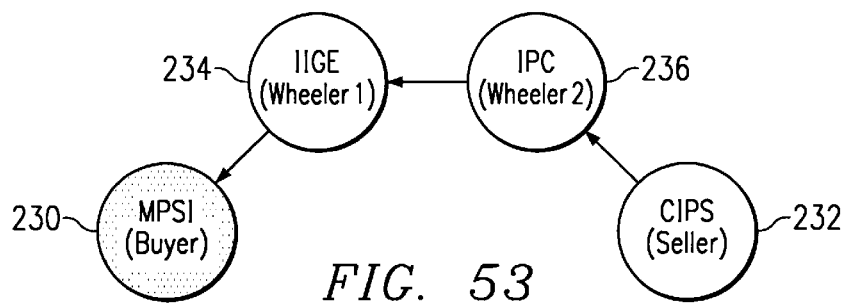

Initiate Curtail

Confirm the following curtail for the Next Hour:

| B/S | MWh | $/MWh | Interface |
|---|---|---|---|
| Buy | 50 | 22.30 | IIGE |

[Confirm] ~270  272~ [Cancel]

FIG. 55

Acknowledge Curtail

The following transaction is curtailed Next Hour:

| B/S | MWh | $/MWh | Interface |
|---|---|---|---|
| Sell | 50 | 20.00 | IPC |

[Acknowledge]

Acknowledge Curtail

The following transaction is curtailed Next Hour:

| B/S | MWh | Interface | Interface |
|---|---|---|---|
| Wheel | 50 | MPSI | IPC |

[Acknowledge]

FIG. 57

Acknowledge Curtail

The following transaction is curtailed Next Hour:

| B/S | MWh | Interface | Interface |
|---|---|---|---|
| Wheel | 50 | IIGE | CIPS |

[Acknowledge]

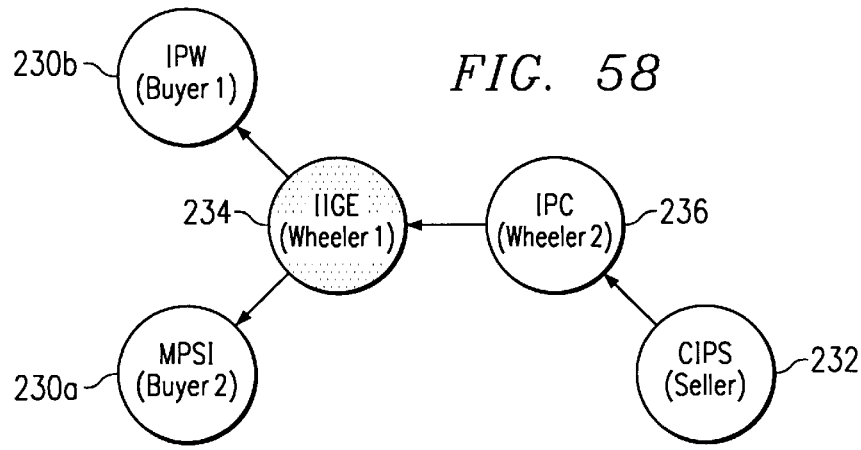

FIG. 58

| Transmission | | | | | | | | | | |
|---|---|---|---|---|---|---|---|---|---|---|
| | Max | | Market Limit | | Available | | Scheduled Activity | | | |
| | | | | | | | Transactions | | Wheeling | |
| Interfaces | In | Out | In | Out | In | Out | In | Out | In | Out |
| MPSI | 400 | 350 | 200 | 350 | 200 | 200 | 0 | 100 | 0 | 50 |
| IPC | 500 | 350 | 150 | 350 | 33 | 350 | 0 | 0 | 117 | 0 |
| IPW | 700 | 700 | 200 | 250 | 160 | 183 | 40 | 0 | 0 | 67 |

280

Limit: 150   Neighbor: 180   [Update] —278

Initiate Curtail —282

Confirm the following curtail for the Next Hour:

| B/S | MWh | Interface | Interface |
|---|---|---|---|
| Wheel | 50 | IPC | MPSI |
| Wheel | 67 | IPC | IPW |

[Confirm] —284   286— [Cancel]

APPARATUS AND METHOD FOR TRADING ELECTRIC ENERGY

TECHNICAL FIELD OF THE INVENTION

The invention relates to an apparatus and method of trading electric energy between utility companies and others. Specifically, the invention is a software product that, when coupled to a communications network, creates a trading environment for the electronic purchase and sale of electric energy, the scheduling and usage of the transmission system, and the automated invoicing and electronic funds transfer for the settlement of transactions.

BACKGROUND OF THE INVENTION

Electric energy is generated for public consumption by utility companies. Each utility company has a service area in which it enjoys near-monopoly status. The utility company is obligated to supply the electric energy needs of individual customers within the service area. Of course, the demand for electricity can vary according to a number of factors. In the long run, the demand for electricity is a function of the population and industries within the service area. In the short run, electrical demand varies according to many factors. Extreme weather, in particular, can significantly strain the generation capacity of the utility company.

An electric energy grid exists which connects each utility's generating facilities to those of adjacent utilities. Each circle represents an individual utility company. Each line represents high-voltage lines which form the grid between the various utilities.

Electric energy is traded between utility companies and other market participants to meet shortfalls in capacity during unit outages, to achieve cost savings, or to increase revenues. "Bulk transactions" refers to the wholesale buying and selling of electrical energy. Typically, the parties involved in these trades are traditional electric utility companies. These companies wish to meet their obligations to provide reliable service to their customers in the most economically feasible manner. Often it is possible for a utility to purchase electricity from a neighboring utility more economically than it could produce it for itself At other times, the power generator can sell excess generation at a price higher than its cost of generation.

To determine which trades are economic, utilities produce sophisticated forecasts of load (required generation) so that they can schedule their generators to run efficiently. The system dispatcher then determines if demand is likely to be over or under projections during various times of the day. The dispatcher is also interested in the associated cost with each level of generation. Even though the load forecasts are sophisticated, actual conditions usually deviate from them. This may be due to a number of circumstances, such as having generating units go off-line unexpectedly, differences between forecast and actual weather conditions, or changes in the price of available fuel to run the generators. All of these events affect the costs to produce electricity. Because of changes in these forecasts, the dispatcher telephones neighboring utility companies to determine prices and quantities of energy available for upcoming hours. These calls occur many times a day, sometimes hourly. At the same time, dispatchers for other utilities are also making phone calls. If the dispatcher finds what he considers to be a good deal, a trade is consummated. The result is that deals are often struck before the phone surveys are complete. It is rare for a dispatcher to call beyond his direct neighbors, and almost never farther out than two companies. This means that the opportunity for more economic transactions may have been overlooked simply because the dispatcher did not know about them.

A need exists for a system which creates substantial efficiency gains by automating this trading process over the current method of using the phone. This method of trading energy should allow utilities to simultaneously view real-time market prices and energy availabilities and to quickly consummate the best opportunities. The system should consider available transmission capacity, and calculate and schedule the least cost path for the energy. It should also report the transactions, invoice the participating parties, and facilitate rapid collection and disbursement of funds. Lastly, the system should allow for anonymous trading required of a true market.

SUMMARY OF THE INVENTION

The present method, also known as CPEX, establishes a nationwide electronic information system that assists buyers and sellers of electricity to conduct business by providing a common marketplace. CPEX is an easy to use windows-based software and hardware system that enables Participants to gather market information and make energy transactions decisions based on the best available opportunities. CPEX involves a software application, a computer and communications network, and a central server.

CPEX allows users to enter quantity and price information on energy that they have available to sell, wish to buy, or both. These offers are then sorted and presented to other CPEX Participants. These offers are sorted by lowest price to highest for purchase opportunities and sorted highest price to lowest for sale opportunities. Each Participant sees delivered price for purchases and total revenue for sales from its unique location in the electric grid. The purchase price of the energy is shown inclusive of any transmission charges, known as "wheeling". Wheeling is a term used to refer to the transfer of electricity across a Participants transmission system. A Participant who provides wheeling services is referred to as a wheeler, and receives monetary compensation for providing this service.

CPEX also allows the buyers and sellers of electrical energy to offer different degrees of firmness for their energy. Interruptible energy may be curtailed, or cut off, for any reason. Non-interruptible energy may only be curtailed to avoid or remedy an unreliable condition. Both types of energy have a distinct market.

CPEX assists in maintaining the reliability of the electric grid by using a conservative method to schedule available transmission capacity. Each Participant maintains the amount of transmission capacity made available for CPEX transactions each hour. As transactions are consummated, this capacity is consumed and is no longer available for use by others. This helps assure that the transmission systems do not become unintentionally overloaded. Reliability is augmented by allowing simultaneous, electronic notification of all parties to a transaction upon a transaction's curtailment. The current method of phone notification is inadequate when multiple parties are involved, as is common in buy/resell types of transactions.

CPEX provides monthly billing and Electronic Funds Transfer (EFT) services for payments and disbursements to all Participants as part of the basic CPEX package. This feature allows Participants to trade with more companies than they would otherwise and to manage their invoicing and collections with their current levels of staffing.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIG. 12 is a program generated screen display which displays the interface path between Participants;

FIG. 13 is a program generated screen display displayed at "market opening";

FIGS. 14 to 27 illustrate the various features of the Market View screen which displays transaction and transmission data for either the Current Hour or the Next Hour;

FIG. 33 is a display of the futures market setup;

FIGS. 42 to 52 depict a curtailment of a current hour transaction initiated by a wheeler;

FIGS. 53 to 57 illustrate a Buyer/Seller curtailment of next hour transactions

FIGS. 58 to 60 illustrate a next hour curtailment initiated by a wheeler;

FIG. 61 depicts a data processing system in the form of a personal computer in which the present invention can be employed.

DETAILED DESCRIPTION OF THE DRAWINGS

Figure 1:
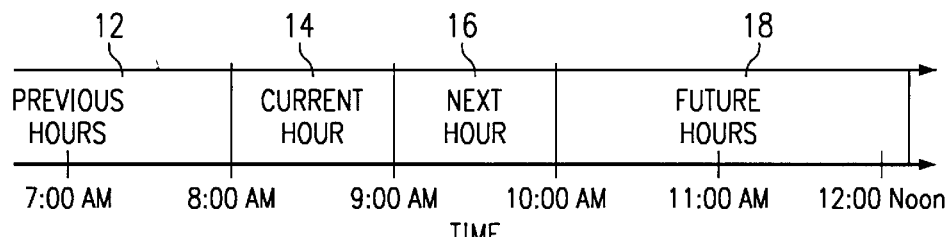
FIG. 1 illustrates the three "markets" established by the present system.

The CPEX system provides a number of advantages over prior art methods of trading electric energy. Referring to FIG. 1, CPEX maintains information on three hourly periods which fall during a continuous time line 10: current hour 14, next-hour 16 and future hours 18. The current hour 14 is the time for which transactions have been previously scheduled and are currently in delivery. The next hour 16 follows the current hour and is the time for which offers to buy or sell are being made in the market and transactions are being consummated and scheduled. The future hours 18 include all hours beyond the next hour. CPEX maintains Participant-input transmission data for all three time periods. As time passes, the next-hour 16 and accompanying transmission data roll forward to become the current hour 14. Likewise, the future hour 18 and accompanying transmission data subject to confirmation, roll forward to become the next hour 16. In a similar fashion, CPEX maintains both current hour and next hour transactions schedules for all Participants. As each current hour passes, it is deemed a previous hour 12 and is stored in a database for billing and statistical purposes.

Market Timing

Figure 2:
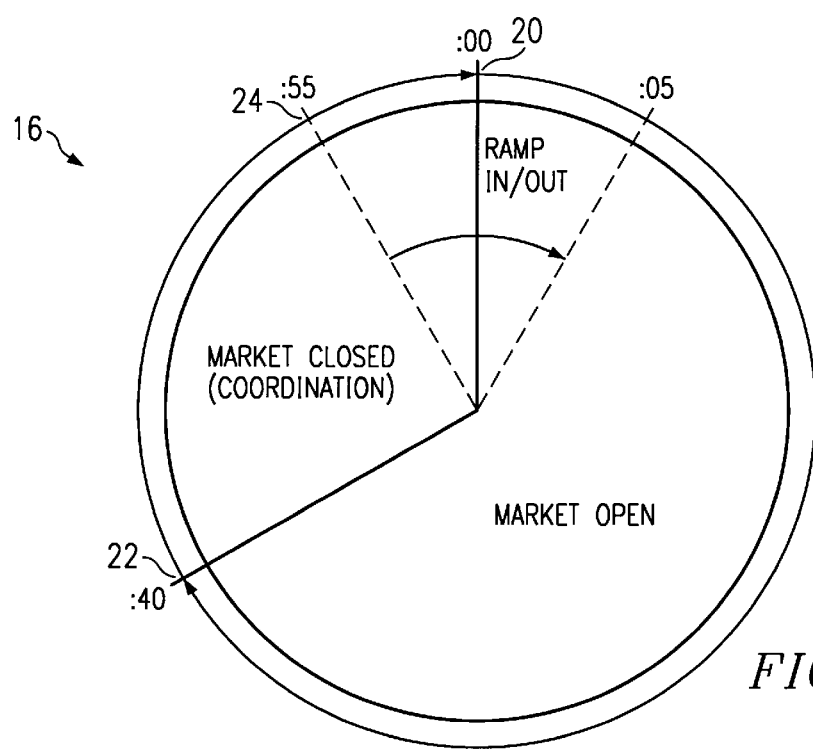
FIG. 2 illustrates the time frame for trading action for the "next-hour" market.

The CPEX next-hour 16 market opens at the top of each hour 20, as shown in FIG. 2, and remains open to forty minutes past the hour 22. During the forty minutes, the identities of Participants submitting and accepting offers to buy and sell hourly energy for the following hour are considered market-sensitive information and held confidential. At forty minutes after the hour, each Participant receives a schedule summary which shows all transactions the Participant is scheduled to participate in during the coming hour. From forty minutes after the hour, to fifty-five minutes after the hour 24, Participants enter CPEX schedules into their energy management systems and complete control area scheduling procedures. Starting at fifty-five minutes after the hour, schedules are ramped in over a ten minute period and energy delivery commences. One hour later, starting at fifty-five minutes after the hour, schedules are likewise ramped out over a ten minute period and energy delivery ends.

Transmission & Wheeling

Figure 3:
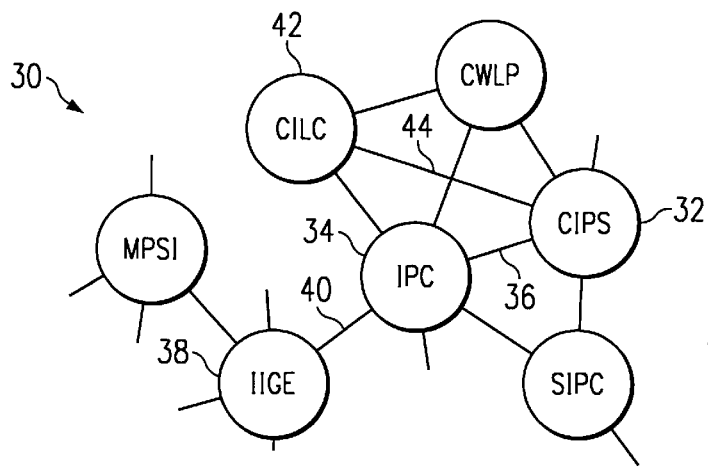
FIG. 3 illustrates a sample of the electrical grid connecting several utilities.

FIG. 3 illustrates seven Participants and the interconnection model in CPEX. Each Participant is a utility company interconnected by high voltage lines. Each Participant is designated by a mnemonic abbreviation. For example, CIPS (Central Illinois Public Service) 32 is connected to IPC (Illinois Power Company) 34 by high voltage lines. Likewise, CIPS 32 is connected to CILC 42 by lines 44. One should also note that CIPS 32 is connected to IIGE 38 by lines 36 and lines 40. Therefore, if CIPS purchases energy from IIGE, the power is routed at least in part over infrastructure owned by IIPC 34. In this situation, IPC 34 is known as a "wheeler." As a wheeler, IPC charges a "wheeling" fee for the use of its infrastructure. This fee is added to the cost of the energy being purchased. Each CPEX Participant must either be a control area or have a contractual arrangement with a control area to provide control area services. In addition, a Participant must have at least one metered or contractual interface with another Participant. In CPEX, Participants are represented as nodes and the transfer capabilities between them as interfaces.

Figure 4:
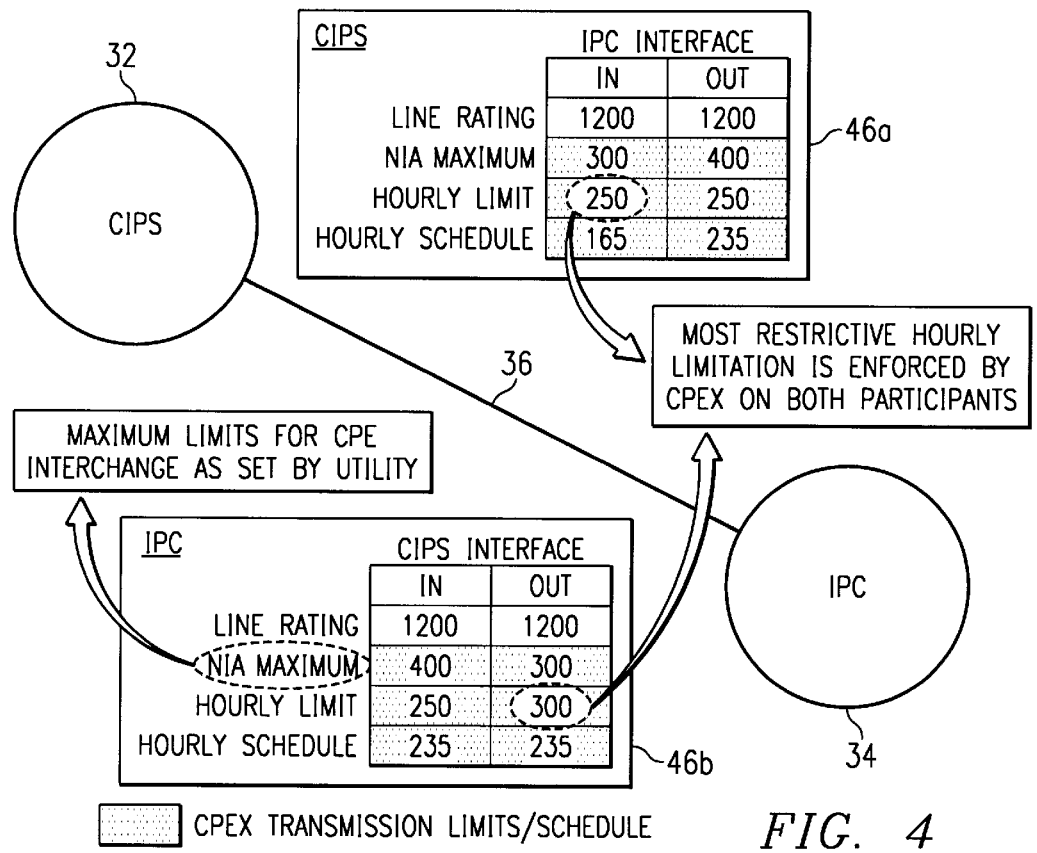
FIG. 4 illustrates the interface limits established for each participating utility.

Participants determine and set the transfer capabilities of each interface. Upon becoming Participants in the CPEX market, each Participant must establish a maximum import and export limit for each interface. These limits are displayed on a computer generated display 46a, 46b. On an ongoing basis, however, each Participant's operators may set the import (In) and export (Out) Hourly Limits at any value between zero and the maximum, based on current operating conditions. As illustrated in FIG. 4, the Hourly Limits set by Participants on either side of an interface may be different. For example, CIPS 32 might consider the hourly input limit on its IPC interface to equal 250 megawatt-hours (MWh). However, IPC might consider the hourly output limit on its CIPS interface to equal 300 MWh. In such a case, CPEX enforces the more restrictive limitation on both Participants. Note that the line limit exceeds the import/export limit. The difference takes into account the amount of energy distributed by the Participant over its lines to its own customers. As Participants accept offers to buy and sell energy, using the CIPS/IPC interface, CPEX indicates the increased scheduling of this interface, as shown by the Hourly Schedule values, and lowers the remaining unused transfer capability by a corresponding amount.

Figure 5:
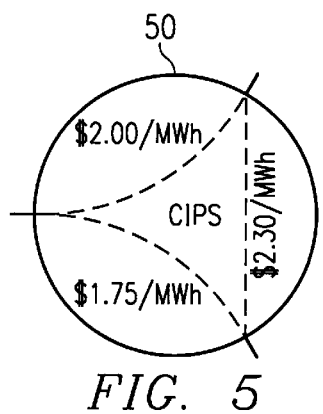
FIG. 5 illustrates sample wheeling charges established by each Participant.

Each Participant also inputs wheeling rates 50 for each interface-to-interface path across its system, as shown in FIG. 5. CPEX considers these rates, in aggregate, to determine the availability and price of each Participant's offer with respect to each and every other Participant. Rates for the Next-hour market may be changed at any time prior to the market opening.

CPEX System Administration

Figure 6:
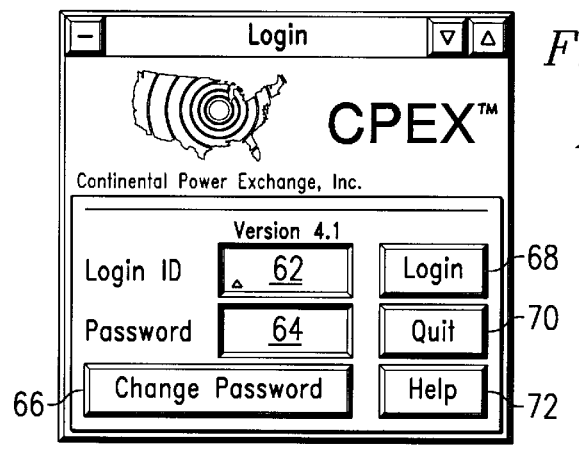
FIG. 6 is a Login screen used to control access to the CPEX system.
Figure 7:
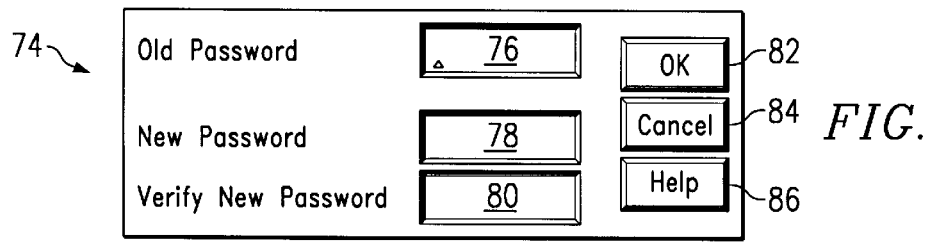
FIG. 7 is a program generated screen display establishing a password.

FIGS. 6 to 12 illustrate several of the software generated screen displays related to administration of the CPEX system. The CPEX system administrator for a Participant is responsible for overseeing CPEX activities, which include: system security, adding and deleting users, and setting trading parameters. FIG. 6 illustrates a login screen 60 which prompts the user to enter a login ID 62 and a unique password 64 associated with that ID. After this is entered, the user can select Login 68 to enter the system. Alternatively, the user can simply quit 70 or solicit help 72 from the system. Alternatively, the user can select change password 66. If the later option is chosen, screen display 74 is presented, as shown in FIG. 7. The user can enter his old password 76 as well as his new password 78. The user must then reenter his new password 80. At this point, the user can select OK 82 to enter the new password. Alternatively, the user can cancel 84 his request or solicit help 86.

Figure 8:
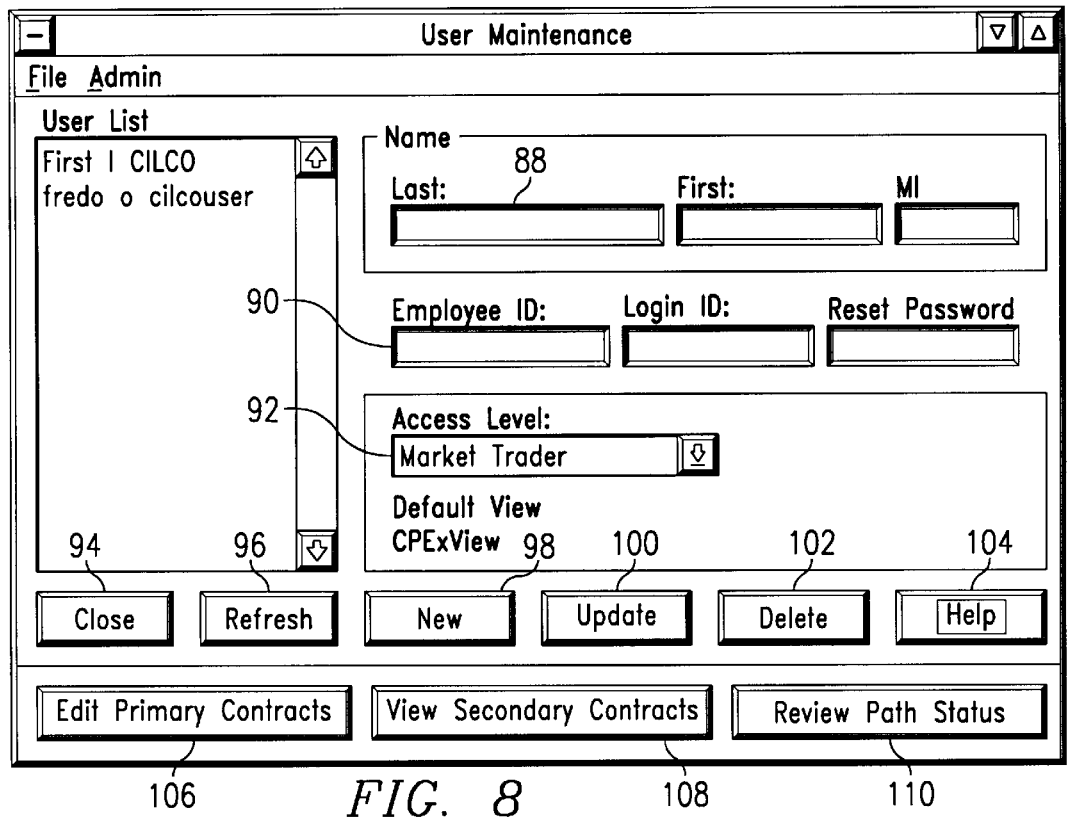
FIG. 8 is a program generated screen display establishing the names of authorized users.

FIG. 8 illustrates a software generated screen displayed after a System Administrator login. The primary purpose of this screen is to add users who trade energy on behalf of the Participant's company. This is done by entering the pertinent information into the various fields. For example, the user's name is entered into field 88. An employee number, such as his social security number is entered into field 90. Two levels of access for the user can be entered into field 92: Market Trader and Market Viewer. Market Trader access allows a user to perform any non-system administration function within CPEX, including submitting, accepting, and curtailing offers to buy and sell energy as well as setting transmission interface limits. Market Viewer access, in contrast, affords a user view-only privileges to market and transmission information, but allows the requesting, saving, and printing of reports.

Figure 9:
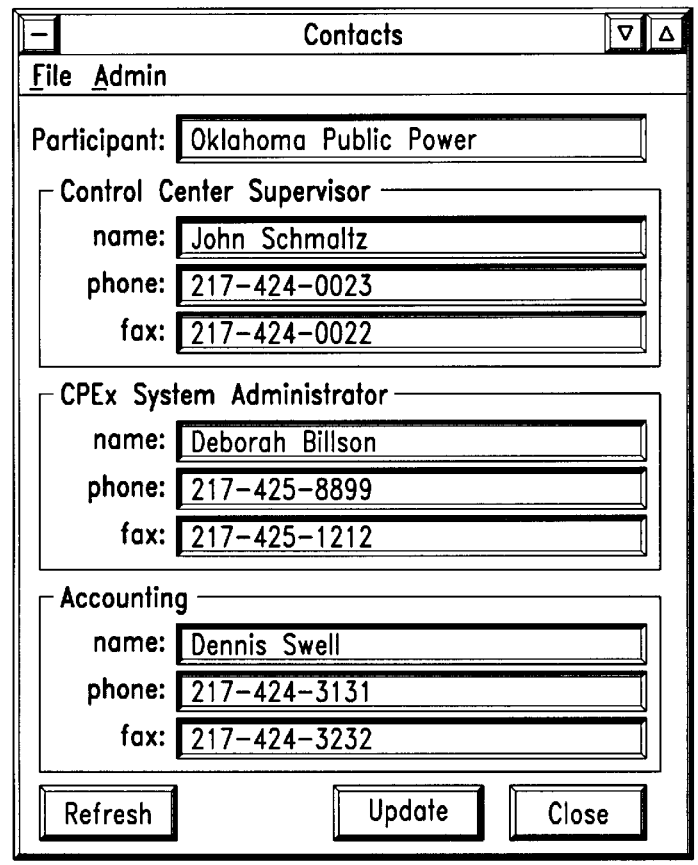
FIGS. 9, 10, and 11 are program generated screen display listing authorized users for each Participant.

All administrator activities are accomplished using the various options provided at the bottom of the software generated display. For example, Close 94 closes the window. Refresh 96 updates the display to reflect any changes. New 98 adds a user to the system. Update 100 stores a change to an existing user's file. Delete 102 removes a user from CPEX. Help 104 accesses helpful information. Edit Primary Contracts 106 manages bilateral energy and wheeling contract information. View Secondary Contracts 108 allows the user to view bilateral energy and wheeling contract information entered by other Participants. Review Path Status 110 allows the user to view availability of all contract paths. There are two menu pads in the menu bar at the top of the User Maintenance screen. File 112 allows the user to logoff. Admin 114 allows the user to toggle between the User Maintenance screen and the Contacts screen. FIG. 9 is a software generated display 112 of the contacts for a Participant. The CPEX administrator defines Participant personnel that have Control Center Supervisor, CPEX System Administrator, Accounting, and Computer Support responsibilities.

Figure 10:
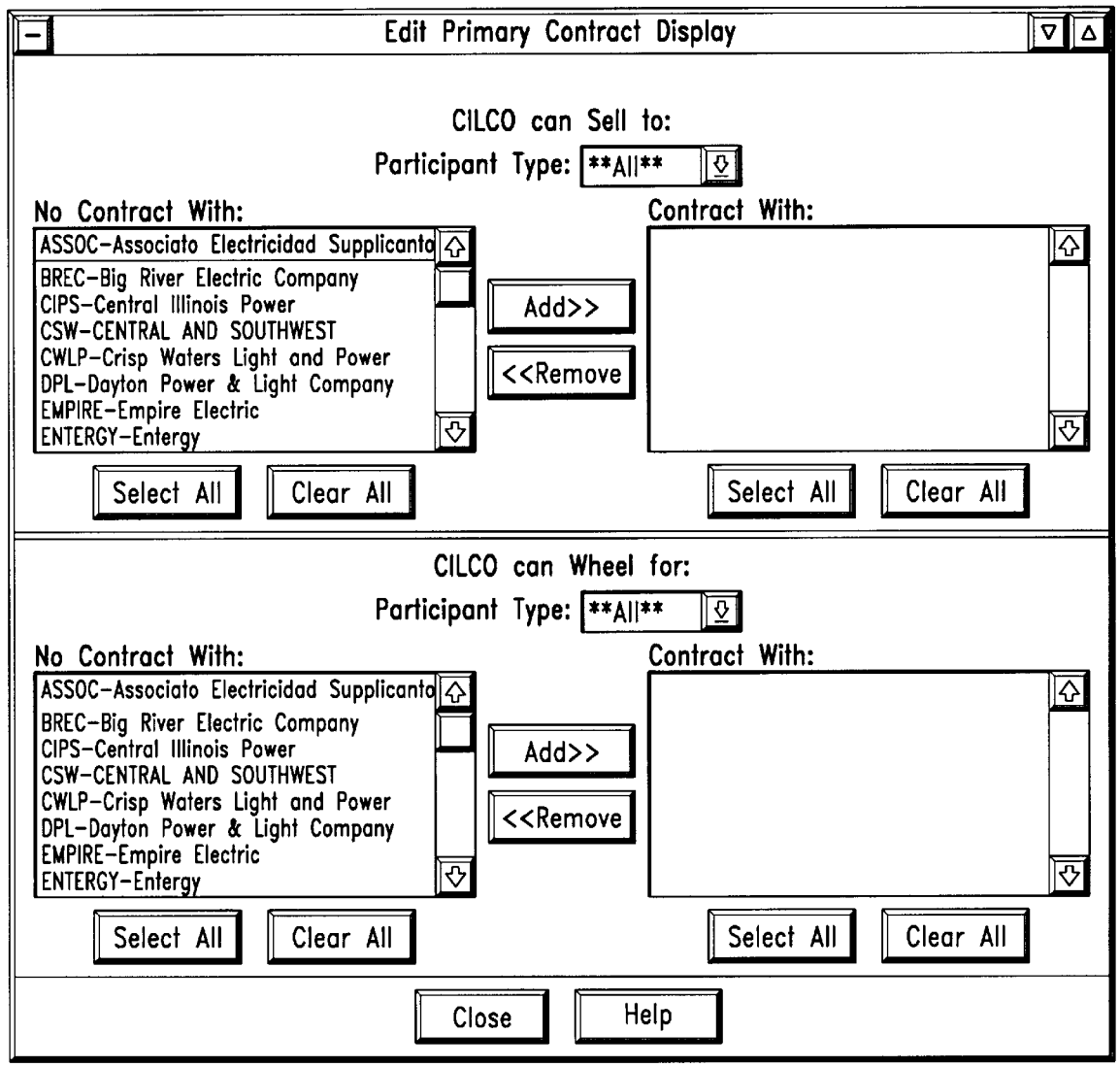
Figure 11:
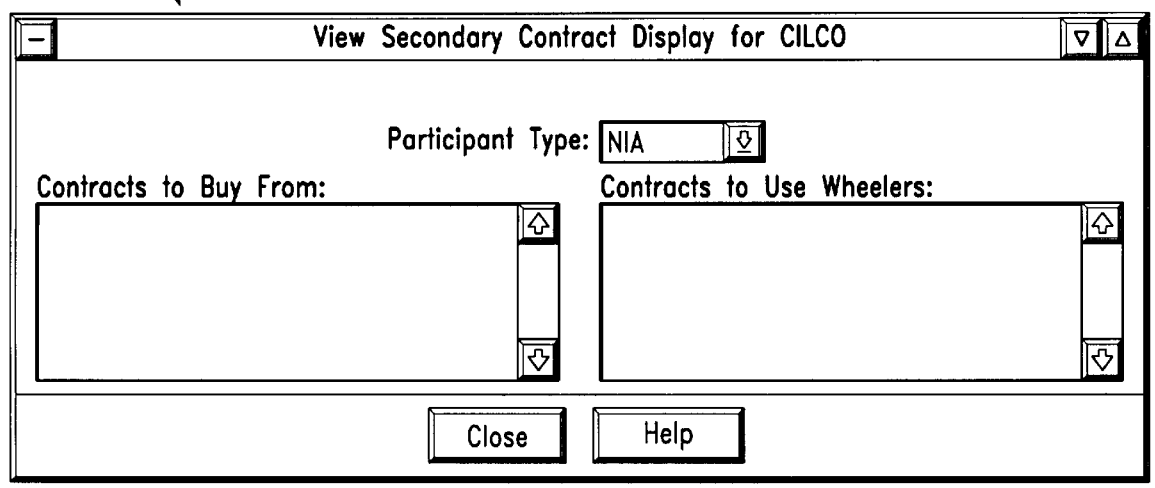

FIG. 10 illustrates the Edit Primary Contract Display 114 which appears when the Edit Primary Contracts button 106 of the "User Maintenance" screen is pressed. In the event a Participant does not have an Open Access Tariff in place, the CPEX administrator can designate which of the Participants it may sell next-hour energy to or provide next-hour wheeling services for. Individual companies are selected by highlighting and clicking with the mouse, then press the Add>>button. Multiple companies may be selected by highlighting and clicking with the mouse with the Ctrl key depressed. If a Participant has Open Access Tariffs in place, then press the Select All button at the bottom of the selection lists, then press the Add>>button. This process is allowed between market close (:04) and transaction start-ramp (:55). FIG. 11 illustrates View Secondary Contract Display screen 116 which appears when the View Secondary Contracts button 108 located at the bottom of the "User Maintenance" screen is selected. This display shows all other Participants that have reported they can sell energy and wheeling services to a Participant. A Participant uses this display to insure the roles of all existing trading partners have been identified properly.

FIG. 12 illustrates the program generated display which appears when the Review Path Status button 110, located at the bottom of the "User Maintenance" screen, is selected. This display allows a Participant to review the status of all paths identified to the CPEX system. It also allows the Participant to change the status of a path or paths. Paths may be excluded at the discretion of any Participant for the various reasons. For example, Valid Path indicates that the path is functional. Equipment Outages indicates that the path is temporarily not functional. Insufficient Contracts indicates that the necessary contracts to trade energy are missing. Unreliable Path indicates that the path is deemed nonfunctional. To change the status of a path, the path is first highlighted. Next, the user selects the "Path Status" pull down menu 120. Once a reason other than "Valid" has been selected, the "Starting Date," "Ending Date," and "Time" fields become active. Either highlight a field and type to change the contents, or use the increase-decrease tab change displayed date and time values. When completed, press the Update Path button 122 to activate the changes. This process is allowed between market close (:40) and transaction start-ramp (:55).

Participation in the Markets (Typical User Interaction)

Once the user has entered the system, the Market Open dialogue box 124 appears, if the market is open. If the market is closed, a blank Market View window is displayed. At the top of each trading hour, CPEX provides the user with both visual and audible notification that the market is open. The Market Open dialogue box presents for confirmation the transmission import and export limits at each interface for the next hour. If the Participant agrees with the listed limits, he selects the Confirm button 126. Based on his current operating conditions, the user may change the Limit In or Limit Out value to any number from zero up to the Max In or Max Out value, respectively, for any interface. The interface limits must be confirmed each hour before a user is allowed to buy or sell energy using CPEX. For the purposes of wheeling, however, the displayed interface limits remains in effect and available for use by other Participants until new limits are entered. The default interface limits displayed by CPEX in the Market Open dialogue box are set by the user in the future Markets Setup screen and may be changed at any time by the user in the Transmission tab of the Transmission View screen.

FIGS. 14 to 27 illustrate the various features of the Market View screen 128 which displays transaction and transmission data for either the Current Hour or the Next Hour. The Market View 128 enables a Participant to submit offers to buy and sell energy, to accept other Participant's offers to buy and sell energy, and to view and curtail confirmed schedules. The Transmission View enables a user to monitor and change transmission interface limits and wheeling rates. After logging into CPEX and confirming transmission limits, CPEX defaults to the Market View shown in FIG. 14. The Current button 130 and Next button 132 centered at the bottom of the display indicates whether the information displayed is Current Hour or Next-hour. The Market View contains two panels 134, 136 with duplicate capabilities. The purpose of this ease-of-use feature is to provide the simultaneous display of two CPEX screens. Attached to each of the two panels are five tabs. Buy 138 allows the user to submit, view, or withdraw offers to buy energy. Sell 140 allows the user to submit, view, or withdraw offers to sell energy. Buy Market 142 allows the user to view or accept other Participants' offers to sell energy. Likewise, Sell Market 144 allows the user to view or accept other Participants' offers to buy energy. Schedule 146 allows the user to view or curtail scheduled transactions. Below the two panels in the Market View is the "dashboard", which contains several displays summarizing the Participant's ongoing CPEX activity. The dashboard is divided into three sections: Schedule List 148, Total/Net Activity Summary 150, and Interface Usage Bar Chart 152.

Referring to FIG. 15a, the Schedule List 148 has several columns and rows. B/S indicates Buy or Sell transactions. MWh indicates the quantity of energy bought or sold in megawatt-hours. N/I indicates whether the transaction is Non-Interruptible or Interruptible energy. Interface indicates the interface over which the transaction is scheduled for the current hour or will be scheduled for the next hour.

The Total/Net Activity Summary 150, shown in FIGS. 15b to 15d, displays the total and net transaction activity. This total and net activity may be displayed in any of three views: Text, Graph MWH, and Graph $. The different views may be selected using the radio buttons below the Total/Net Activity Summary. The Text view, FIG. 15b, displays the various information. Buy indicates the Total Quantity (MWh) and Cost ($) of all energy purchases for either the Current or Next-hour. "PI" indicates the Participant's Performance Index for most recent 100 energy purchases and sales. This Index indicates how many of the most recent 100 transactions, in which the Participant was a buyer or seller, were not curtailed by the Participant. Sell indicates the Total Quantity (MWh) and (Revenue) ($) of all energy sales for either the Current or Next-hour. Net indicates the Net Quantity (MWh) and Cost/(Revenue) ($) of all energy bought and sold for either the Current or Next-hour. Wheel indicates the Total Quantity (MWh) and (Revenue) ($) from wheeling energy for either the Current or Next-hour.

The Graph MWh view, FIG. 15c, consists of a two-dimensional chart. The vertical axis scales the MWh values and the horizontal axis scales minutes of the hourly market. Displayed is the chronological history of the Participant's CPEX activity with respect to the quantity of energy (MWh) bought, sold, and wheeled during the Current Hour or Next-hour. A first style of line indicates the quantity of energy sold, a second style of line indicates the quantity of energy purchased, and a third style of line indicates the quantity of energy wheeled. This view provides the user with helpful information regarding the timing of market activity during the trading hour.

The Graph $ view, FIG. 15d, consists of a two-dimensional chart. The vertical axis scales the $ values and the horizontal axis scales minutes of the hourly market. Displayed is the chronological history of the Participant's CPEX activity with respect the cost incurred or revenue generated ($) during the current hour or next-hour. A first style line indicates the revenue from energy sold, a second style line indicates the cost of energy purchased, and a third style line indicates the revenue from energy wheeled. This view also provides the user with helpful information regarding the timing of market activity during the trading hour.

The Interface Usage Bar Chart, FIG. 15e, graphically displays both available and scheduled interface capacity (MW) into ("In") and out of ("Out") each of the Participant's interfaces. The MW values across the top are automatically scaled to accommodate user-input interface limits. The first color bar indicates unscheduled and, for the Next-hour, available interface capacity. A second color bar indicates the scheduling of the Participant's own energy purchases or sales across the interface, while a third color bar indicates the scheduling of wheeling.

At the bottom of the display are several other options. Transmission displays Transmission View, discussed in greater detail below. When Transmission View is displayed, this becomes the Market button used to toggle back to the Market View. Future Market displays Future Market Setup. Reveal displays Current or Next-hour schedule revealing the identities of all parties to each transaction. US Map displays the Participant Connections diagram. Reports displays the Reports menu. Logout logs the user out of CPEX. Help displays the Help menu.

Figure 16:
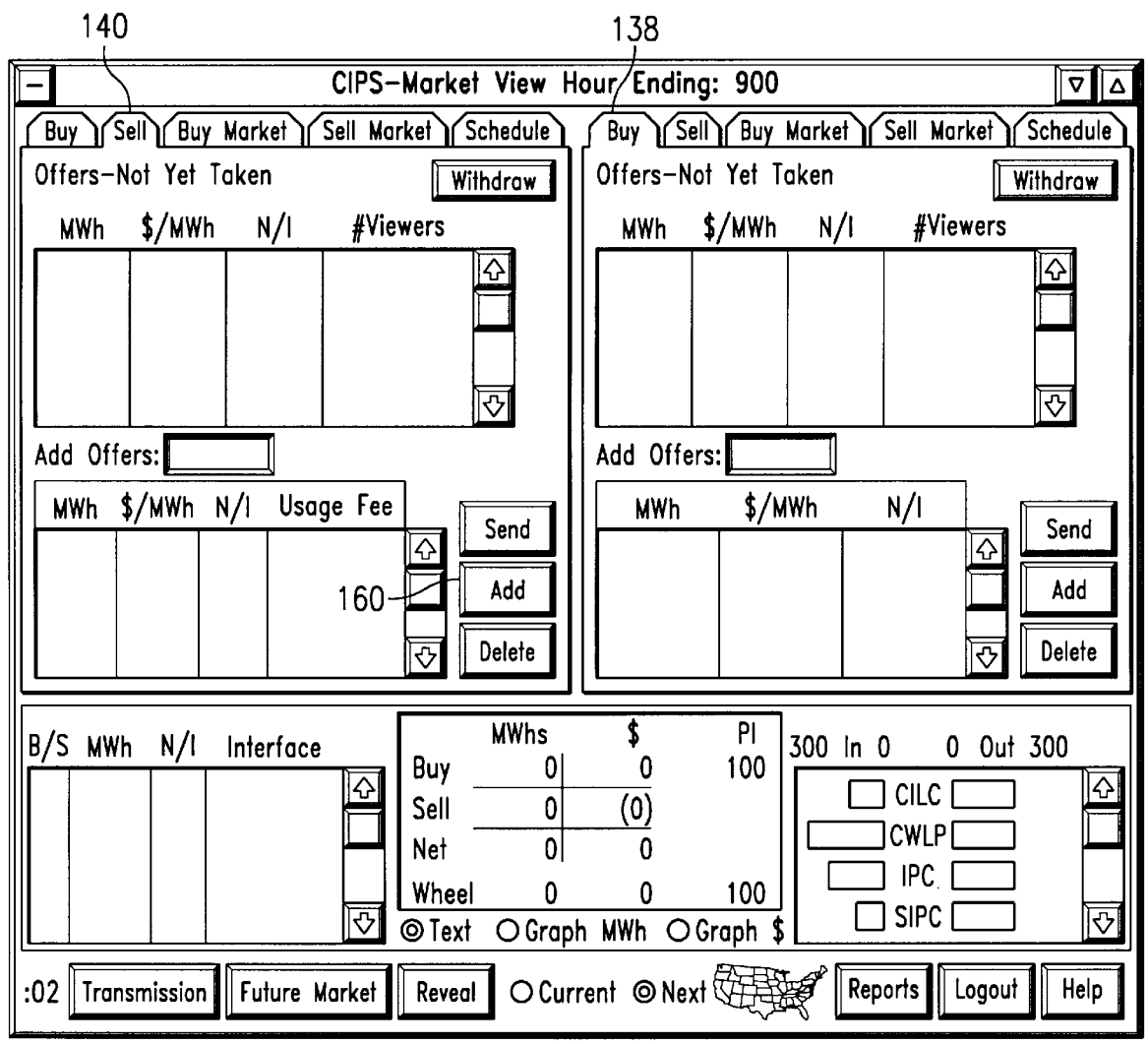
Figure 17:
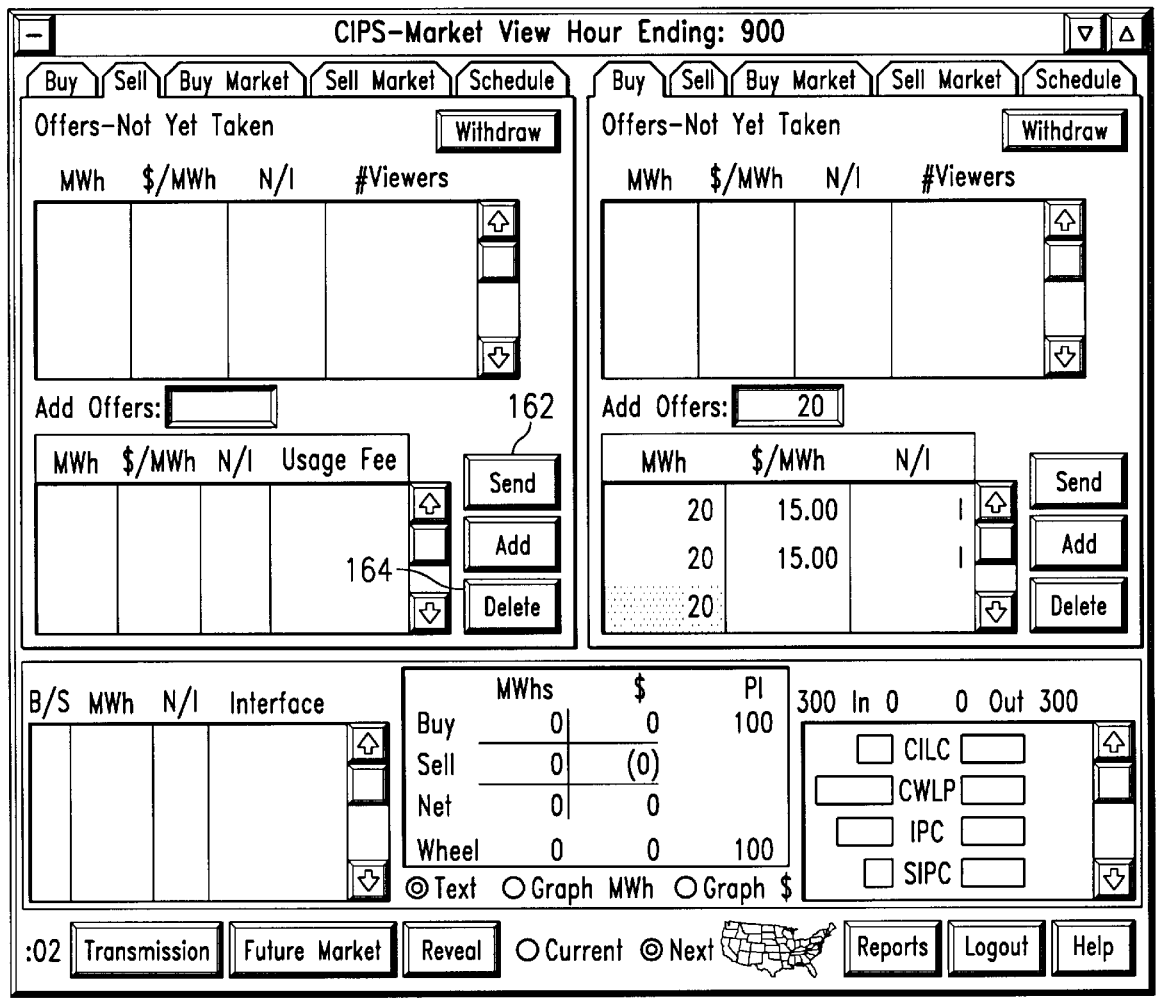
Figure 18:
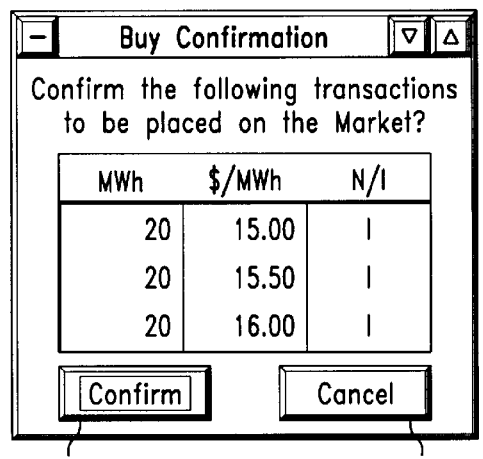

FIGS. 16 to 18 illustrate a Participant submitting an offer to buy or sell energy by selecting the Buy or Sell tabs in the Market View when the market is open. The user has selected the Sell tab 140 in the left panel and the Buy tab 138 in the right panel. To submit an offer to buy or sell energy, the user presses the Add button 160 in either the Buy or Sell panel and enters the following information about the offer. MWh indicates the quantity of energy (MWh) being offered for sale or purchase. $/MWh indicates the purchase or sell price ($/MWh) being offered. N/I indicates whether the sale is non-interruptible or interruptible energy. Usage Fee indicates the amount ($/MWh) to be added to the offered sell price which may be used to separate some portion of the sales revenue for accounting purposes (not applicable for the Buy tab). Upon entering an offer(s) to buy or sell, as shown below, the user may press the Send button 162 to submit the offer(s) to the marketplace or press the Delete button 164 to remove the offer(s). After pressing the Send button 162, the dialogue box of FIG. 18 appears, prompting the user to confirm its offers to be submitted to the marketplace. Upon reviewing the offers, the user may press the Confirm 166 button to submit the offers or press the Cancel button 168 to terminate the process and return to the Market View.

Figure 19:
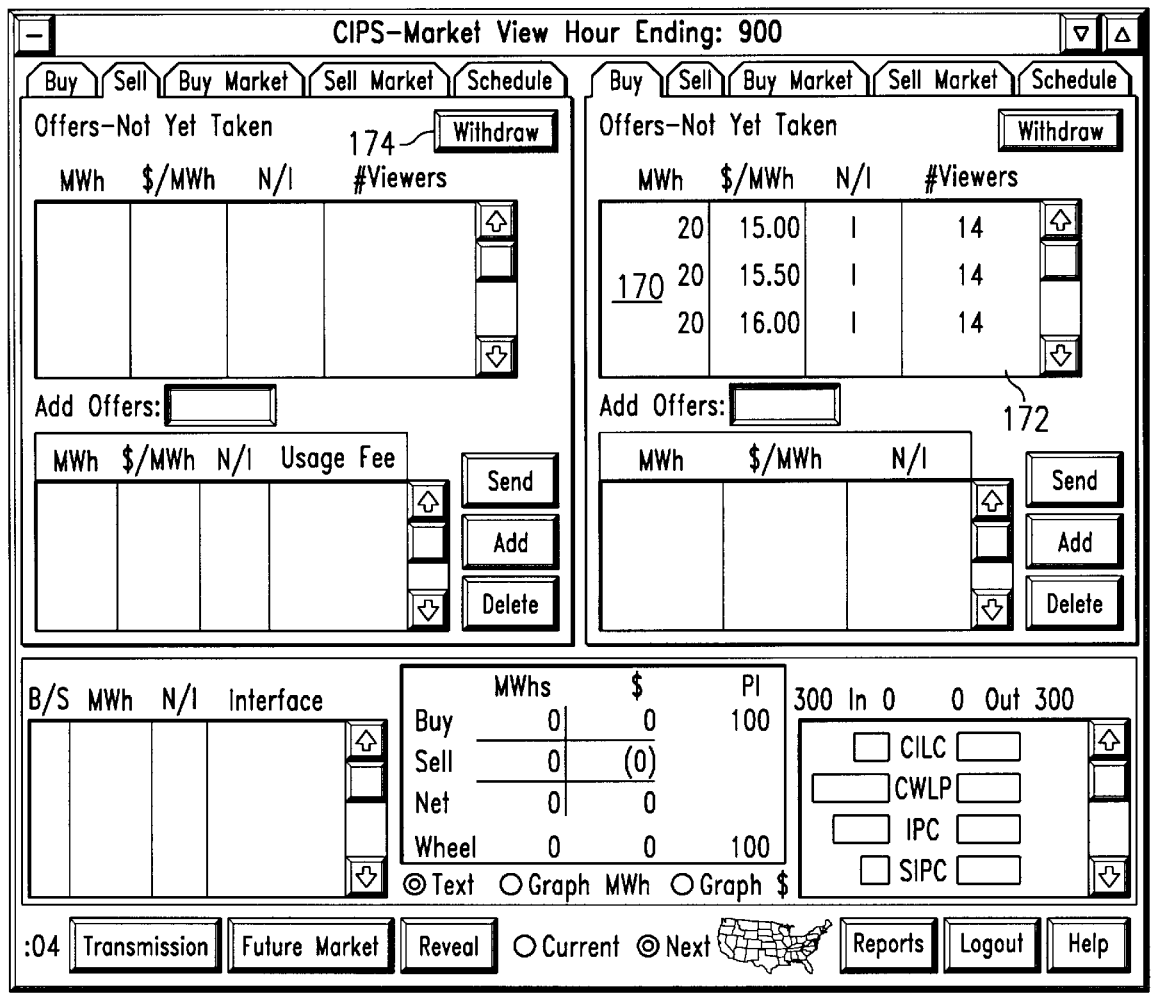

If confirmed, the offers are communicated and available to all Participants for which a feasible transmission scheduling path exists. Upon selecting the Confirm button, the Offer—Not Yet Taken table in the Buy tab of the Market View is updated to reflect the offer just submitted to the marketplace. As shown in FIG. 19, offers are now displayed in the right menu. For example, the offer is for the sale of 20 MWh at $15.00/MWh. This offer is for "interruptible" energy. In other words, if a buyer accepts this offer, he must be prepared to have the supply of this energy interrupted if the Seller needs the energy to supply its own user base. For these offers submitted but not yet accepted by another Participant, the number of viewers 172 indicates the number of Participants for which a feasible contract path exists to schedule the transaction. In the example above, there are 14 other Participants that can view and, if desired, accept the user's offer(s) to buy energy.

After a buy or sell offer has been submitted to the marketplace, the user may withdraw the offer prior to another Participant accepting it. To do so, the user selects the offer in the Offers—Not Yet Taken table and press the Withdraw button 174. The user is then required to confirm or cancel the withdrawal and, upon confirmation, the offer is removed from the marketplace and is no longer available to other Participants.

In addition to submitting offers to buy or sell energy, a user may also accept other Participants offers to buy or sell energy. This is accomplished by selecting the Buy Market or Sell Market tabs in the Market View when the market is open. The naming convention for the Sell Market and Buy Market tabs is from the user's perspective. For example, the Sell Market displays other Participants' offers to buy which represent selling opportunities for the user. Similarly, the Buy Market displays other Participants' offers to sell which represent buying opportunities for the user.

Figure 20:
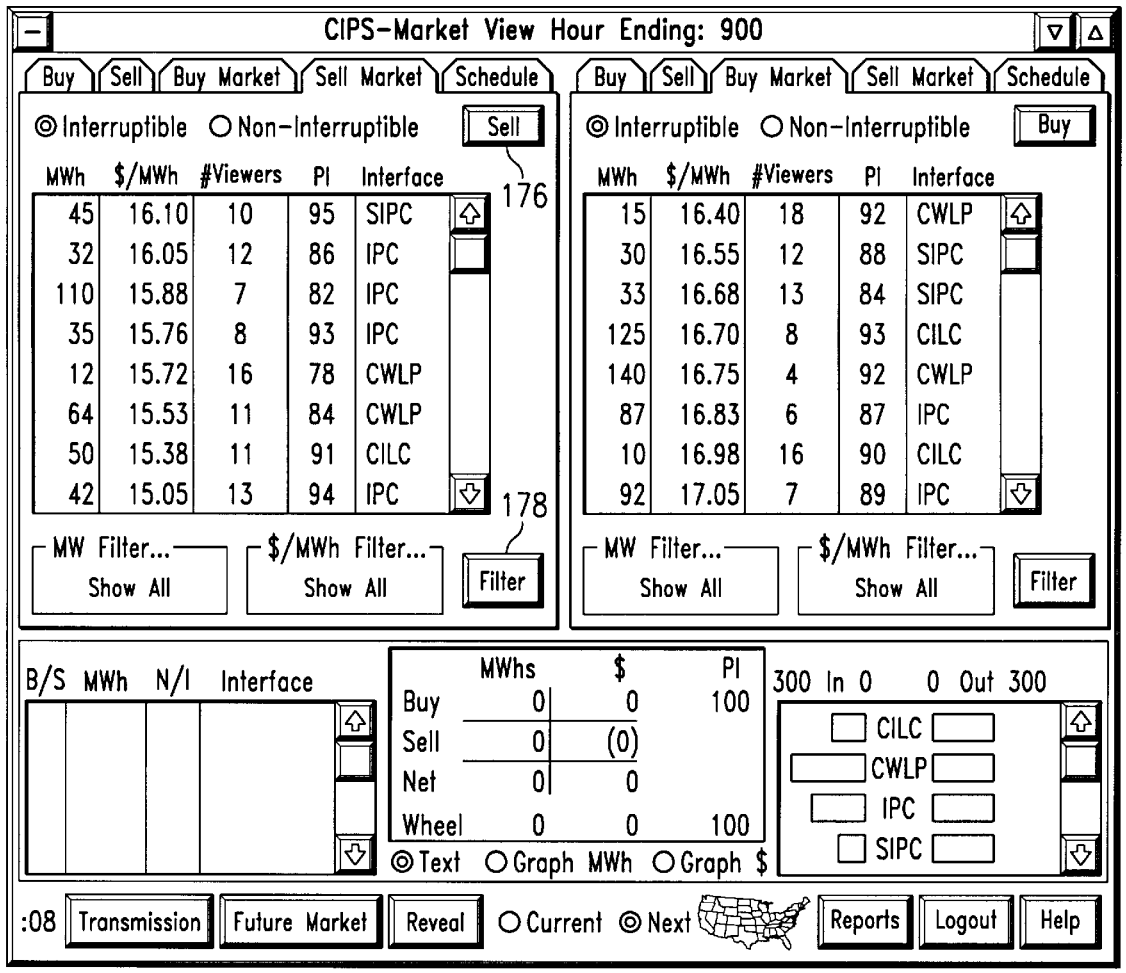

FIG. 20 illustrates the software generated screen displayed when the user selects the Sell Market tab in the left panel and the Buy Market tab in the right panel. Participants' offers to sell energy in the Buy Market table are displayed in "best-cost" (ascending) order based on the $/MWh price. Participants' offers to buy energy in the Sell Market table are likewise displayed in the "best-cost" (descending) order. Offers displayed in each table are available to the user and reflect a deliverable price and quantity of energy. Using the radio buttons at the top of each panel, the user may designate whether he wishes to view interruptible or non-interruptible energy offers. As many as 40 offers may be displayed in each table at any one time. Information is displayed for each offer in the Sell Market and Buy Market. MWh indicates the quantity of energy offered for sell or purchase. $/MWh indicates the price of energy net of any applicable wheeling charges. CPEX determines the least cost, feasible contract path for scheduling each transaction. For sell offers in the Buy Market table, this price includes any wheeling charges. For buy offers in the Sell Market table, this price represents the net revenue available to the user net of any wheeling charges. # of Viewers indicates the total number of Participants for whom a feasible contract path exists over which to schedule the transaction. "PI" indicates the Performance Index of the offer that acts as a reliability indicator. This Index reflects the recent tendency of parties to an offer (e.g., buyer/seller and/or wheelers) to curtail transactions. As previously described, CPEX maintains both a buy/sell PI and a wheeling PI for each Participant. The buy/sell PI represents the number of times out of the most recent 100 transactions for which the Participant was a Buyer or Seller that it did not initiate curtailment. For example, if a Participant curtailed eight out of the most recent 100 transactions for which it was a Buyer or Seller, its buy/sell PI would be 92. Similarly, if a Participant curtailed three of the most recent 100 transactions for which it was a Wheeler, its wheeling PI would be 97. For transactions involving no wheelers, the PI associated with an individual offer is the Buyer's or Seller's buy/sell PI. For transactions involving wheelers, the PI associated with an individual offer is the product of every Wheeler's wheeling PI and the Buyer's or Seller's buy/sell PI:

| Buyer/Seller PI | Wheeler 1 PI | PI of the Offer |
|---|---|---|
| .92 x | 97 = | .89 |

Interface indicates the interface over which the transaction would be scheduled if the offer were accepted. This interface is on the lease-cost path available for scheduling the transaction.

Within the Buy Market and Sell Market tabs, two buttons are available to the user for acting on the offers. The Buy/Sell button accepts, upon confirmation, the selected offer(s) to buy or sell. Up to three offers to buy or sell may be selected at one time. The Filter button allows the user to specify MWh and/or $/MWh criteria for displaying offers in the Buy Market or Sell Market tables. To accept an offer(s) to buy or sell, the user selects the desired offer(s) in either the Buy Market or the Sell Market table and presses the Buy or Sell button, respectively.

Figure 21:
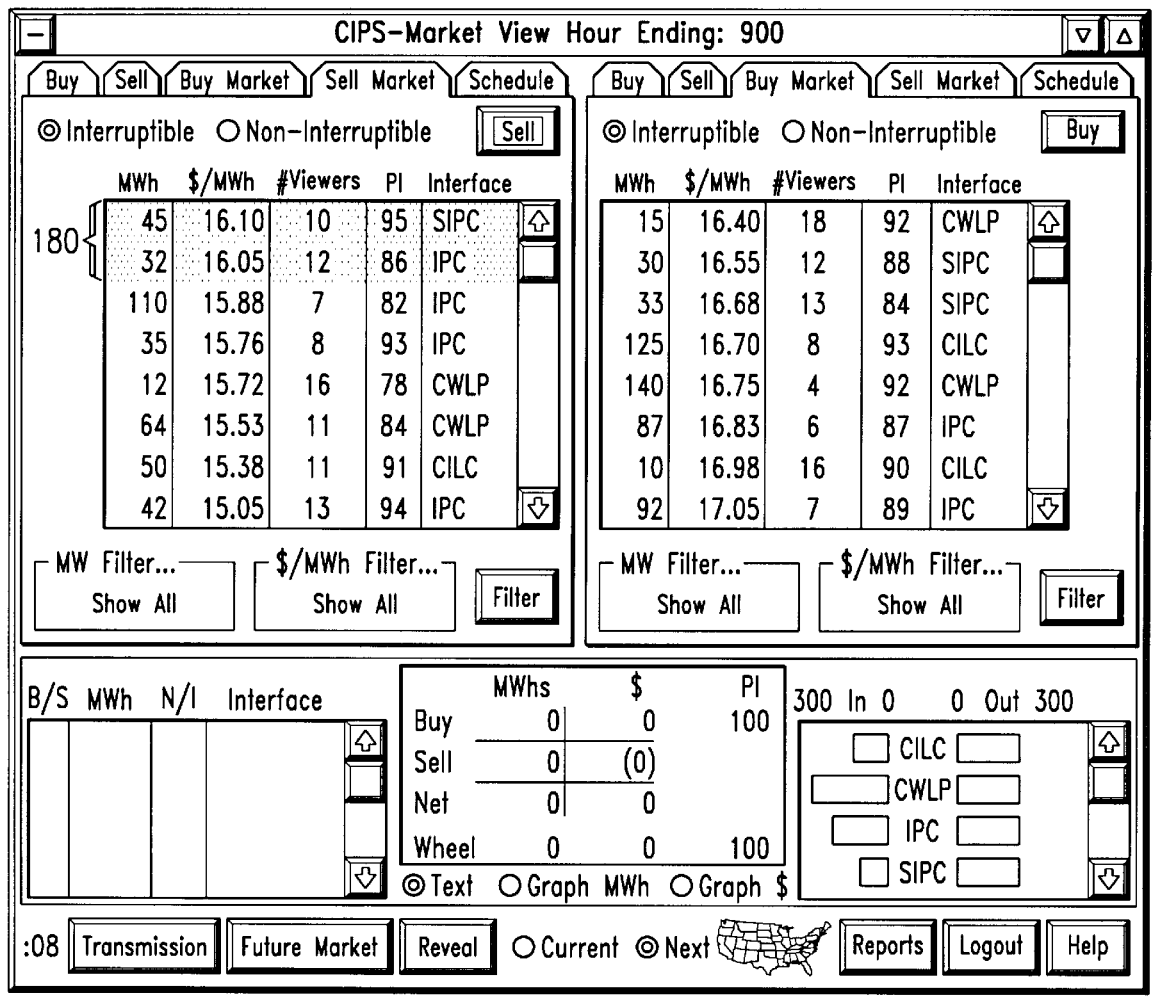
Figure 22:
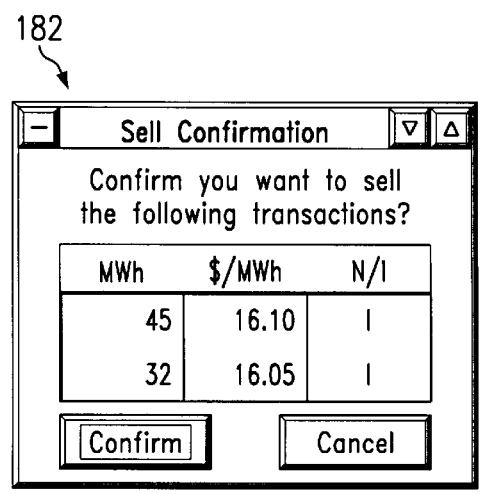
Figures 23, 24, 25:
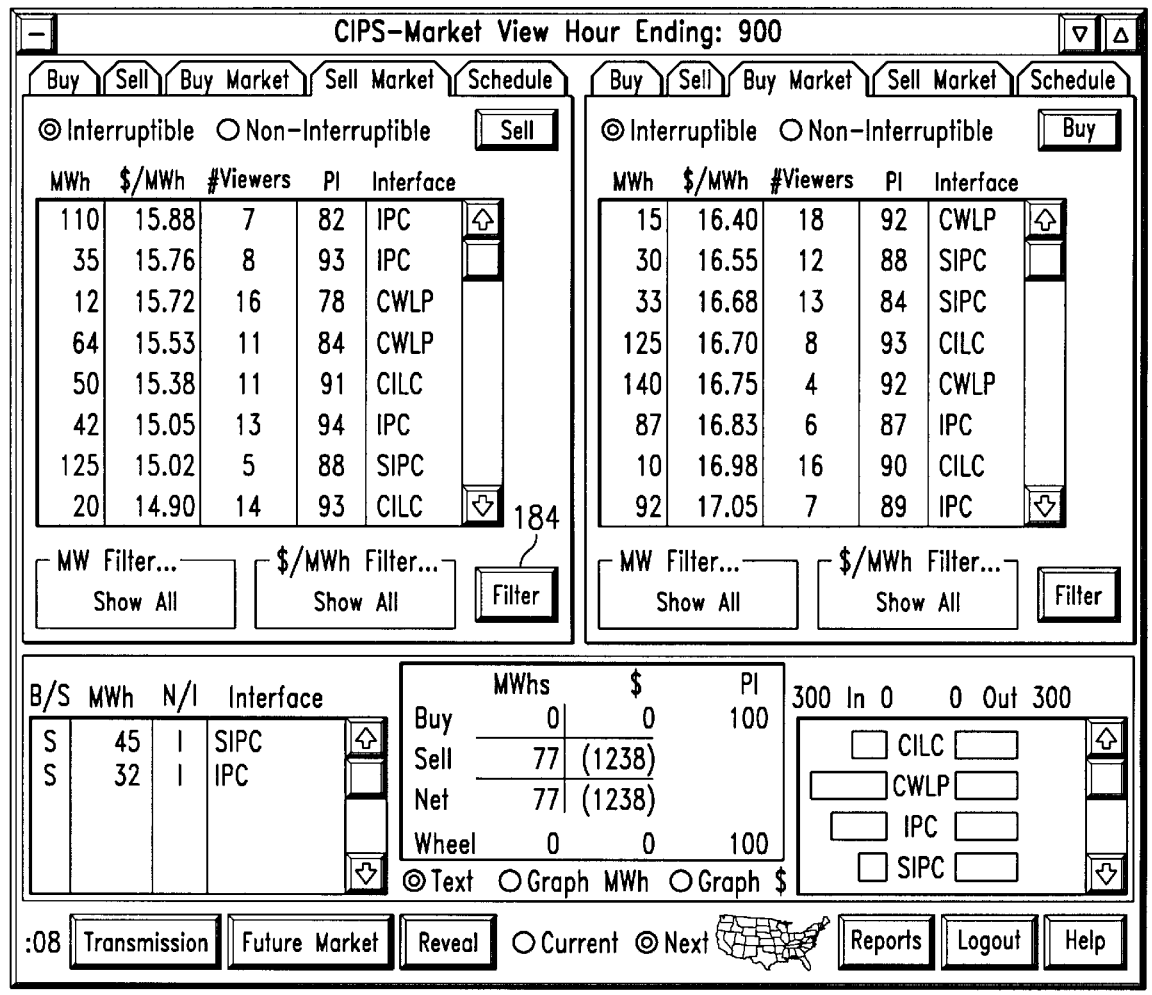

FIG. 21 illustrates the software generated screen displayed when the user selects the two offers paying highest prices 180 in the Sell Market table. In other words, a Participant with excess energy can choose to sell this excess to the highest bidder. In this example, one Participant has offered to pay $16.10/MWh for 45 MWh. A second bid has also been accepted to buy 32 MWh at $16.05/MWh. Upon pressing the Sell button, the Sell Confirmation dialogue box 182, shown in FIG. 22, appears. Upon reviewing the offer(s) selected, the user may confirm the sales by pressing the Confirm button or deselect the offer(s) and terminate the sell process by pressing the Cancel button.

After pressing the Confirm button, the Market View is updated to reflect the acceptance of the two offers, as shown below. First, the two offers accepted are no longer available to Participants and are removed from the Sell Market table. In addition, each of the three displays in the Activity Summary, or "Dashboard" are updated. The Schedule List shows the two transactions just accepted and the Total/Net Activity Summary indicates total sales of 77 MW generating $1,238 in revenue. The Interface Usage Bar Chart reflects the effect of the two transactions on available interface capacity. Both the SIPC and the IPC "Out" interface capacity bar chart are partly shaded GREEN to indicate the scheduling of sales across those interfaces.

Figure 26:
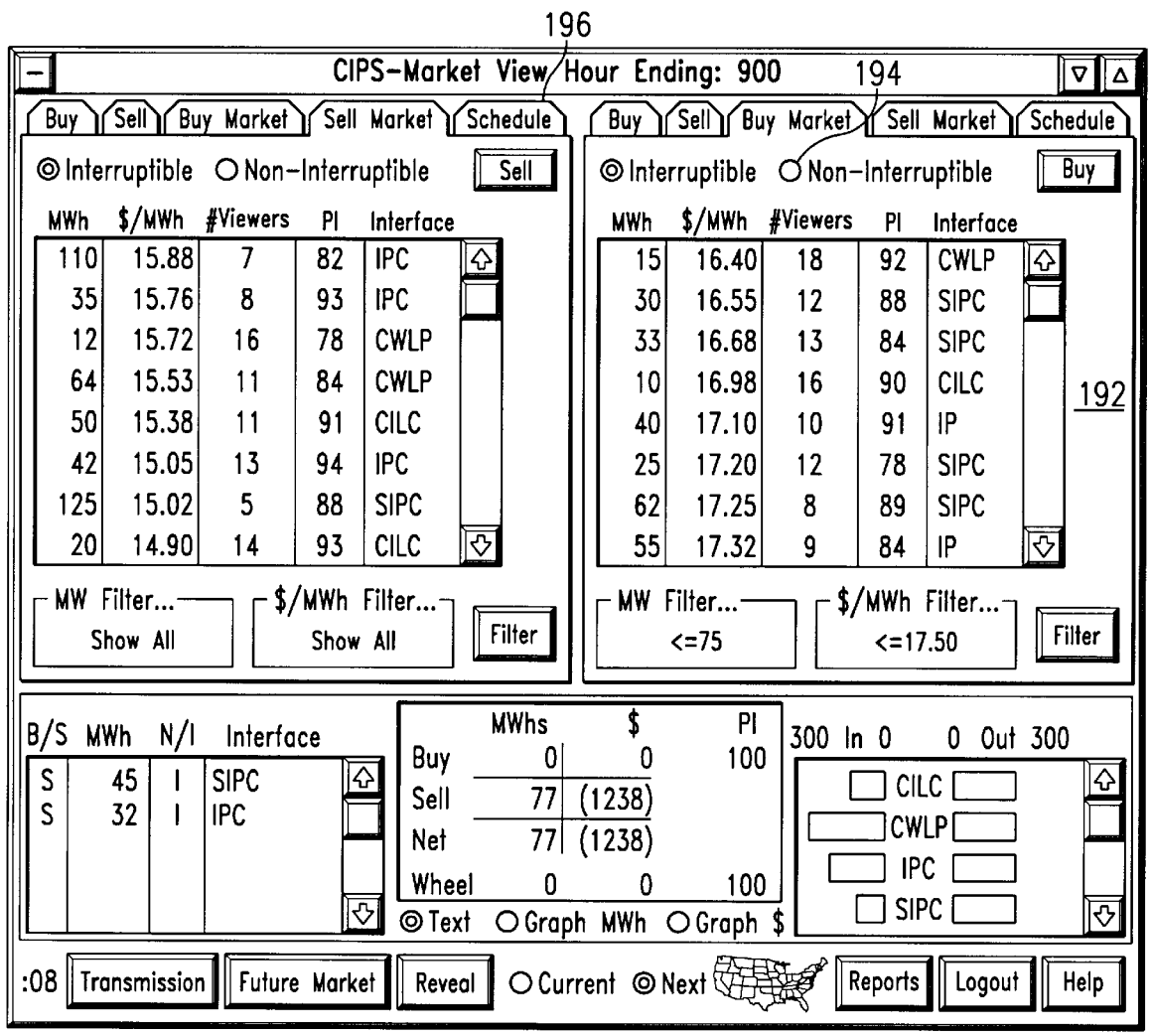

To increase the effectiveness of CPEX for each Participant, a Filter button 184 is provided for both the Sell Market and the Buy Market tables. This feature enables the user to screen, or "filter," offers in the Buy Market or Sell Market tables. When the user presses the Filter button, the dialogue box shown in FIGS. 24 and 25 appears. If the user is, for example, unable to buy more than 75 MW of interruptible energy for the Next-hour and unwilling to pay more than $17.50/MWh for that energy, he may filter the offers to reflect those parameters. This is accomplished using the ">=" and "<=" radio buttons 186 and MWh and $/MWh data entry fields 188, 190 as shown in the dialogue box below. If the user wishes to cancel the filter entries and return to the Buy Market, he may press the Cancel button. If the user wishes to implement the filter entries, he may press the Accept button. Upon pressing the Accept button, the Buy Market table 196 is updated to reflect the new filter criteria as shown in FIG. 26. Unless changed by the operator, these filter criteria apply to both the interruptible and the non-interruptible offer tables in this Buy Market panel. However, the Buy Market tab may also be selected in the left-side panel of CPEX, the non-interruptible radio button 194 selected, and a different set of filter criteria input and applied to that Buy Market table. All filter criteria remain in effect until changed by the user.

Figure 27:
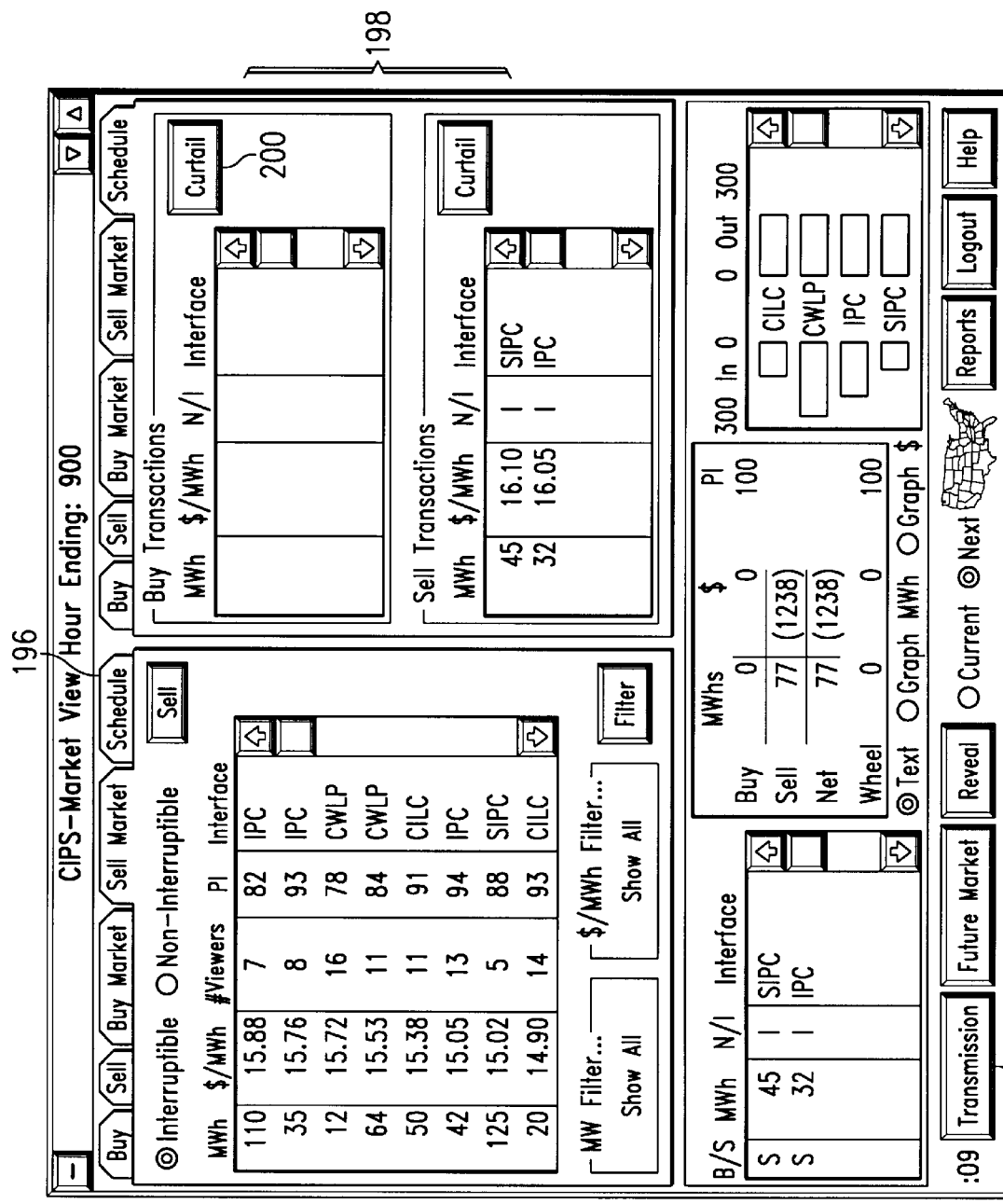

The Schedule tab 196 displays information concerning each consummated Buy and Sell transaction of the Participant for either the Current or Next-hour. FIG. 27 illustrates the software generated screen displayed when the Schedule tab 196 is selected in the right side panel. For each buy and sell transaction, the Schedule tab 198 displays information for the transaction. MWh indicates the quantity of energy bought or sold. $/MWh indicates the price paid for energy purchases or price received for energy sales. N/I indicates whether the energy sale is non-interruptible or interruptible. Interface indicates which interface over which the transaction is scheduled for the Current Hour or will be scheduled for the Next-hour. From the Schedule tab, individual buy or sell transactions may be curtailed as necessary using the Curtail button 200.

Figure 28:
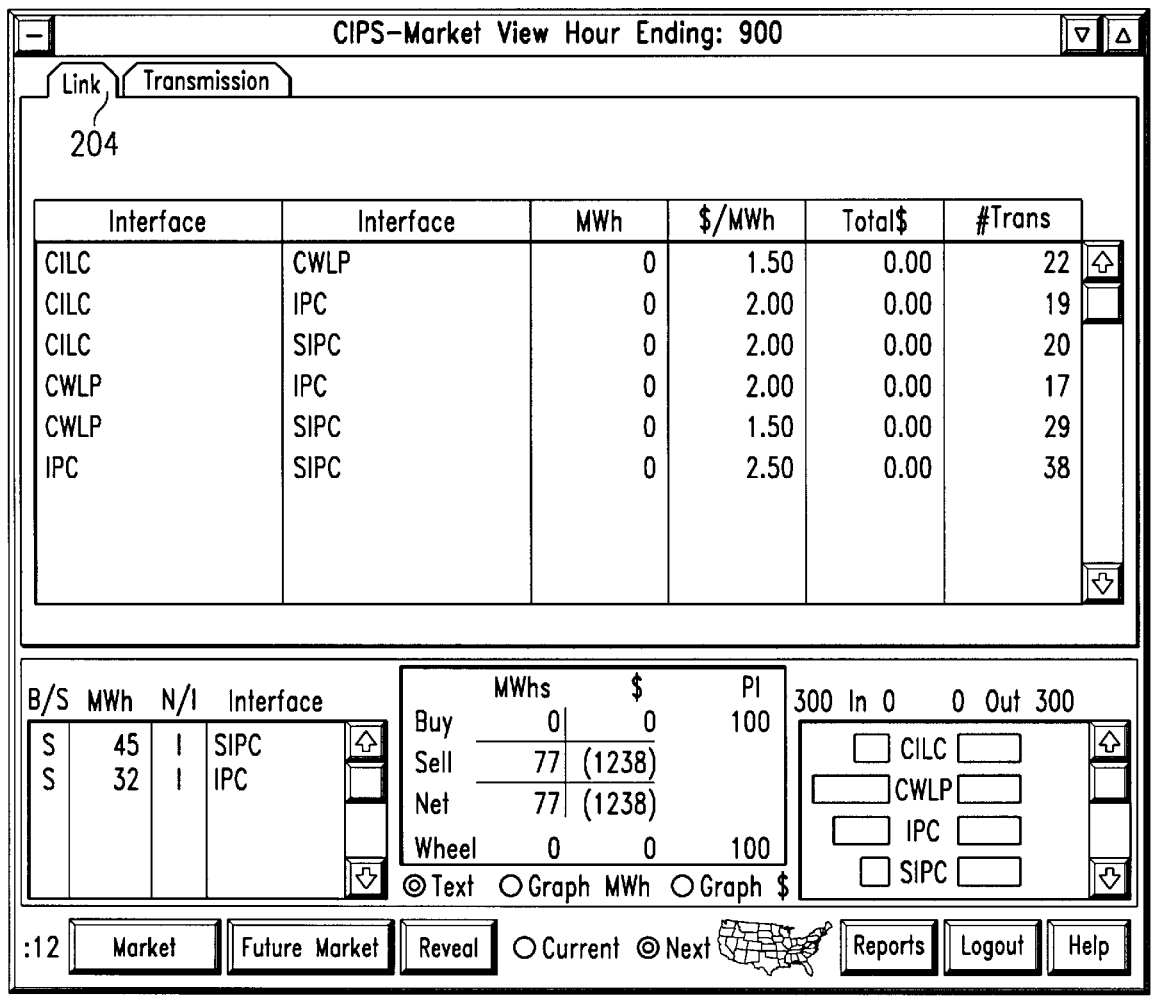
FIGS. 28 illustrates the Link tab display of each interface-to-interface contract wheeling path across the Participant's system.
Figure 29:
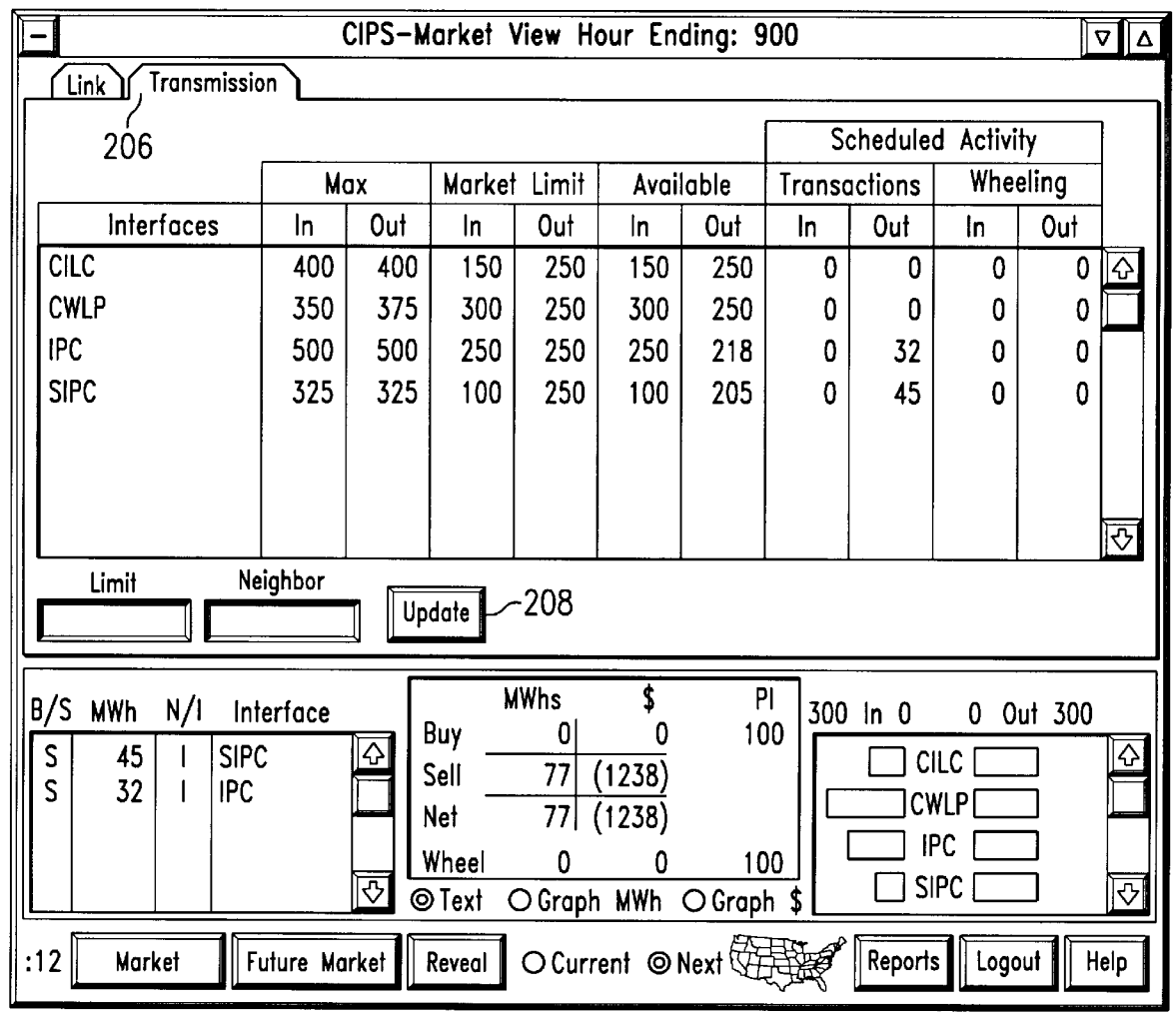
FIG. 29 indicates the transaction scheduling and availability at each of the Participant's interfaces.

From the Market View, the user may press the Transmission button 202 in the lower left corner to toggle to the Transmission View which is shown in FIGS. 28 and 29. Within the Transmission View, two displays are available for both the current hour and the next-hour. The Link tab 204 displays information concerning the scheduling of all interface-to-interface contract wheeling paths across the Participant's system. The Transmission tab 206 displays information concerning the availability and scheduling of each of the Participant's interfaces with other Participants.

Referring to FIG. 28, the Link tab 204 displays information for each interface-to-interface contract wheeling path across the Participant's system. Interface indicates the point or group of points on the Participant's system at which energy is scheduled to or from another Participant. MWh indicates the quantity of energy wheeled/scheduled between the two interfaces of each path. $/MWh indicates the wheeling rate for each path. Total $ indicates the total wheeling revenue from transactions scheduled on each path. "# Trans" indicates the number of offers available in the marketplace which rely on each path in its least cost path determination. All information in the Link table is view-only. Wheeling rates may be updated prior to market opening in the Future Markets Setup.

Referring to FIG. 29, the Transmission tab generates a software generated display which indicates the transaction scheduling and availability at each of the Participant's interfaces. Interface indicates the point or group of points on the Participant's system at which energy is scheduled. Max (In/Out) indicates the maximum import and export limit at each interface for CPEX transactions as specified by the Participant. Selecting the Max In or Max Out limit for any interface causes the corresponding maximum limit designated by the Participant's neighbor on that interface to be displayed in the lower left corner of the Transmission tab panel. The maximum limits set by neighboring Participants for the same interface need not agree. Instead, CPEX imposes the lower of the two Participants' maximum limits on the hourly Market Limits set by each Participant's user. Market Limit (In/Out) indicates the hourly import and export limit at each interface for CPEX transactions as specified by the user. These limits can be between zero and the Max Limit for the interface and are confirmed by the user when the market opens each hour. These limits may be changed by the user at any time for either the current Hour or the Next-hour by selecting the limit to be changed, entering the new limit, and pressing the Update button 208. When selecting a Market Limit, the corresponding Market Limit designated by the Participant's neighbor on that interface is displayed in the lower left corner of the Transmission tab panel. The hourly Market Limits set by neighboring Participants for the same interface need not agree. In determining whether or not a transaction can be scheduled across an interface, CPEX relies on the lower of the two neighboring Participants' Market Limits. If a Market Limit is reduced to a value less than the Scheduled Activity across that interface, a curtailment(s) is required. Available indicates the remaining hourly import and export capability at each interface and represents the difference between the Market Limit and all scheduled activity. Transactions indicates the total quantity of energy sales and purchases scheduled across each interface. Wheeling indicates the total quantity of energy wheeling scheduled across each interface.

Figure 30:
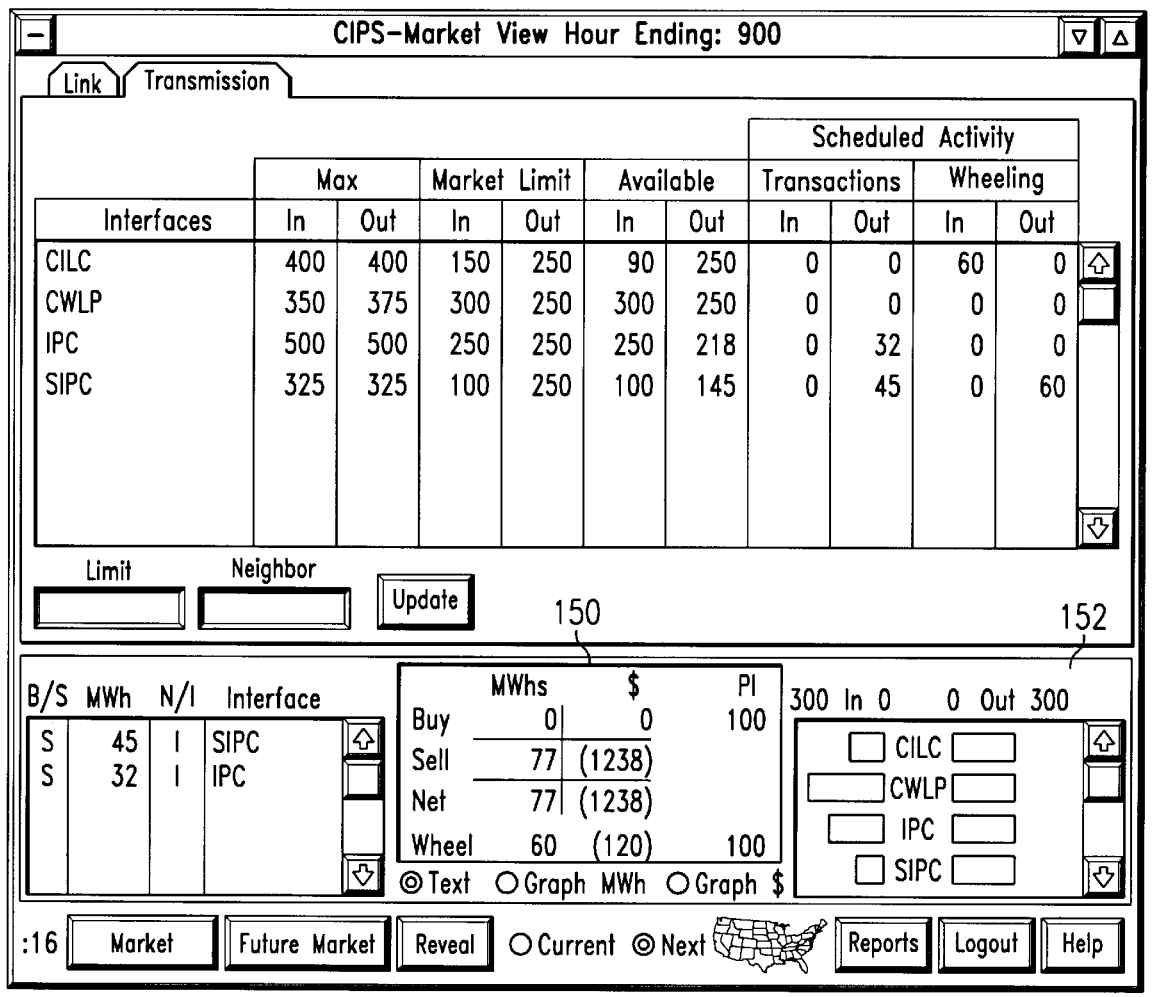
FIGS. 30 to 31 illustrate the participant's transmission limits including he effects of any wheeling transactions.
Figure 31:
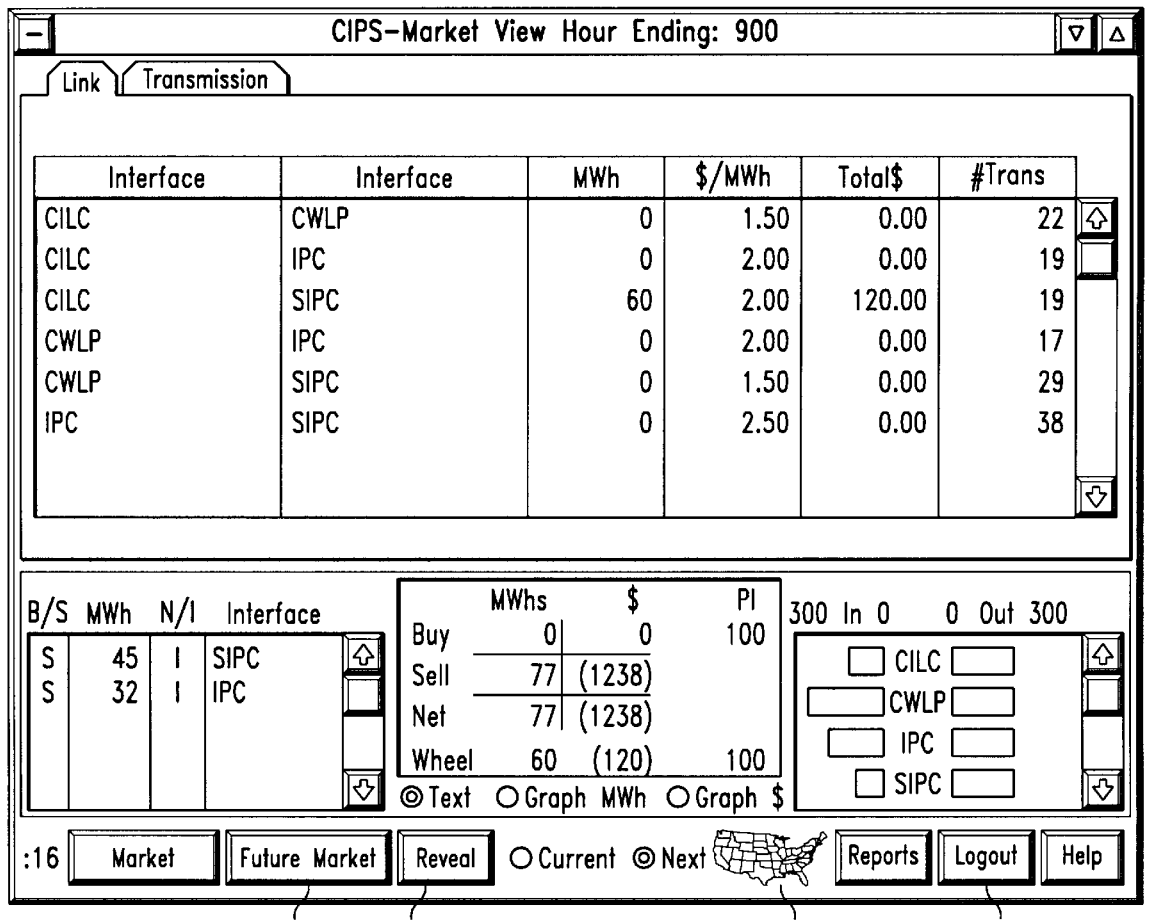

The designation of Market Limits in CPEX makes transmission available to all Participants on a first-come, first-served basis. Once these limits are confirmed when the market opens each hour, the transmission made available may be used by the transmission-owning Participant for its own energy purchase or sales or by other Participants to wheel energy. Anytime a transaction is consummated which relies on a Participant's available interface capabilities for least cost scheduling, the Participant is immediately made aware of the transmission service to be provided, as indicated in the Transmission tab panel shown in FIG. 30. In this example, Central Illinois Public Service (CIPS) will wheel 60 MW of Next-hour energy received from CILC and delivered to SIPC. The Transmission table reflects this amount in Scheduled Activity and reduces Available interface capacity by the same amount. The Total/Net Activity Summary 150 is also updated to reflect the 60 MW of energy to be wheeled and the $120 of wheeling revenue to be earned. Likewise, the Interface Usage Bar Chart 152 reflects the effect of the wheeling transaction on available interface capacity. Both the SIPC "In" and the IPC "Out" interface capacity bar charts are partly shaded to indicate the scheduling of wheeling across those interfaces. A reduction in the Transmission Market Limits may result in the curtailment of scheduled transactions. If this occurs, the user is required to confirm or cancel the transmission interface capacity update. FIG. 31 illustrates a software generated screen displayed when the Link table of the Transmission View is updated to reflect the wheeling transaction. The CILC/SIPC interface-to-interface path includes the 60 MW wheeling transaction and $120 of wheeling revenue based on the $2.00/MWh wheeling rate.

Figure 32:
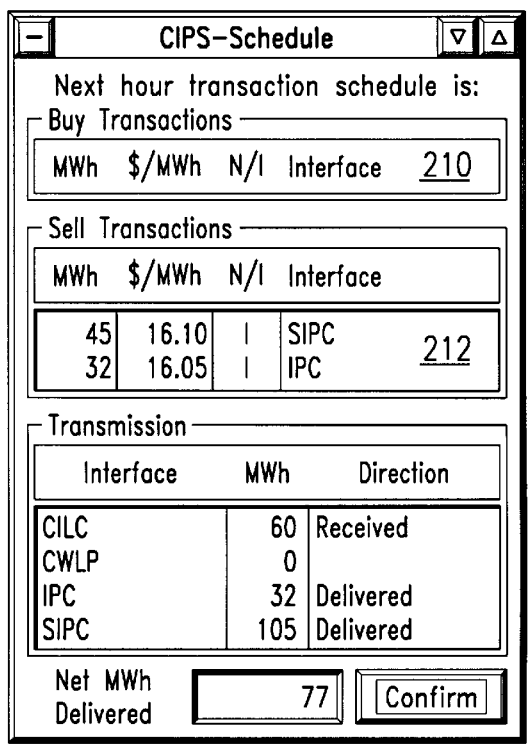
FIG. 32 illustrates the schedule summary received by each Participant.

At the close of the market at forty minutes after the hour, each Participant receives the Schedule Summary shown in FIG. 32. Information about each Buy and Sell Transaction is displayed as in the Schedule tab of the Market View. In this example, there are no buy transactions 210, but there are two sell transactions 212. In other words, CIPS has agreed to sell 77 MWh of energy during the next-hour. In addition, information concerning the net interchange schedule over each interface is also provided. Specifically, the quantity (MWh) and direction (delivered/received) of energy scheduled over each interface, including sales, purchases, and wheeling, is noted as well as the Participant's total net interchange. To remove the Schedule Summary display, the user presses the Confirm button. Should any transactions to which the Participant is a party be curtailed after market closing and prior to ramping in, a revised Schedule Summary accompanies the curtailment notification.

FIG. 33 illustrates the software generated Future Markets Setup screen which enables the user to store default values for transmission service (wheeling rates) and transmission (interface) limits, as well as offers to buy and sell energy. This screen is accessed by selecting the Future Market button 214 on the Market View screen. The values displayed in the Future Market setup take effect at the beginning of the Next-hour and every hour thereafter unless the values are changed in the Future Markets Setup. To change a transmission (wheeling) service charge for subsequent hours, the user selects the desired interface and enters the new rate for the appropriate wheeling path in the upper right panel of this display. At the beginning of the hour, this new rate will be displayed n the $MWh column of the Link display. To change transmission (interface) limited for subsequent hours, the user selects the desired interface and enters the new Limit In or Limit Out value in the lower right panel of this display. When the market opens for the Next-hour, the revised limit is reflected in the interface limits table of the Market Open dialogue box and in the Transmission table of the Transmission View. The user may also store buy and sell offers in the Future Market Setup, as the upper and lower left panels of the display indicate. When the market opens Next-hour, these offers are "pre-loaded" in the Participant's Buy and Sell tabs of the Market View. The user must then press the Send button within the Buy or Sell tabs to submit these offers to the marketplace; otherwise, the offers are not displayed to any other Participants. The user may edit information (MWh, $/MWh, N/I or Usage Fee) about these "pre-loaded" offers in the Buy or Sell tab prior to submitting the offer to the marketplace. "Pre-loaded" offers may also be deleted.

Figure 34:
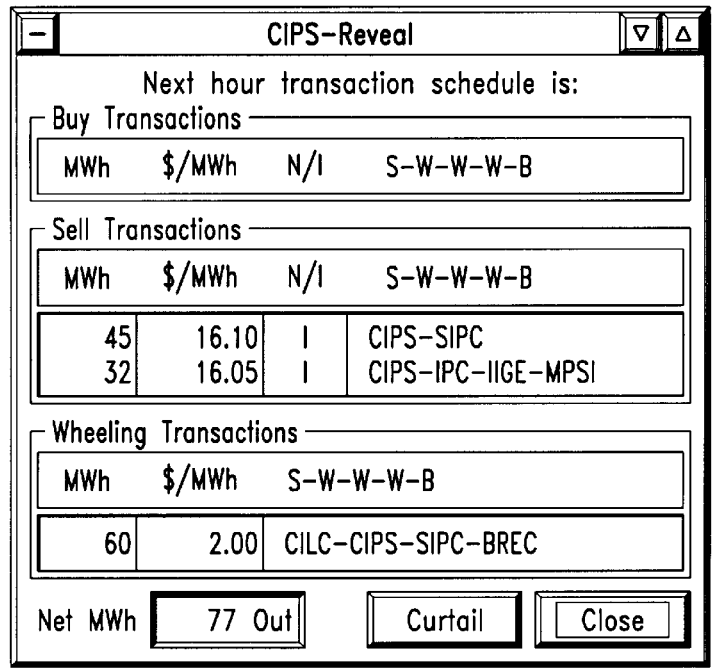
FIGS. 34 and 35 display the identity of the participant's next hour transaction partners.

The Reveal button 216, shown in FIG. 31, allows the user to know the identities and roles of all parties to each Next-hour and Current Hour transaction to which it is a party. The Reveal button is activated if the Current Hour radio button at the bottom center of the CPEX display is selected or if the Next-hour radio button is selected and the market has closed. The designation of this radio button determines whether the transactions displayed are Next-hour or Current Hour. FIG. 34 illustrates the screen displayed when the Reveal button is selected. Information concerning all Buy, Sell, and Wheeling transactions to which the Participant is party are displayed as shown to the right. The identity of the Buyer, Seller, and Wheeler(s), if any, for each transaction is revealed. The total net scheduled interchange for the Participant is also displayed. If necessary, the user may curtail an individual Buy, Sell or Wheeling transaction by selecting the transaction and pressing the Curtail button. To remove the Reveal display, the user may press the Close button.

Figure 35:
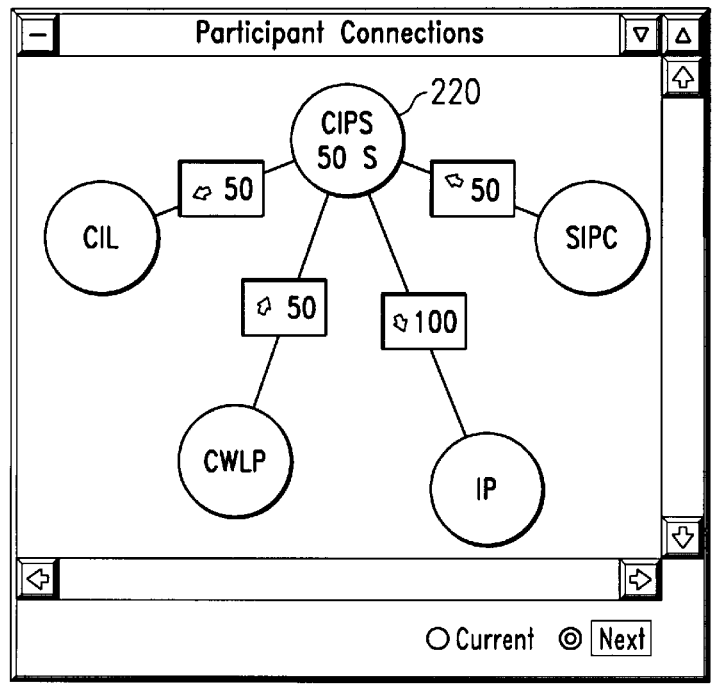
Figure 36:
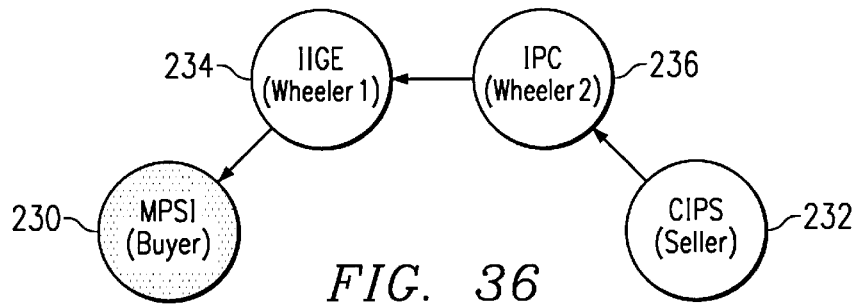
FIGS. 36 to 41 depict a curtailment of a current hour transaction initiated by either a buyer or seller.

Pressing the US Map button 218, shown in FIG. 31, provides the Participant with a Connections "bubble" diagram as shown in FIG. 35. This graphic includes the Participant, the Participant's directly-connected Participants, and the net interchange with each for both the Current and the Next-hour. The value within the Participant's "bubble" 220 indicates the net interchange with all of the Participants. For example, in this example, the net effect of the Participant's activities resulted in the sale of 50 MWh of next-hour energy. The values on the tielines between Participant "bubbles" indicate the net amount and direction of interchange between the two Participants.

To Logout of CPEX the user presses the Logout button 220 at the bottom right of the CPEX display. The user is prompted to confirm that he wishes to Logout, and upon doing so, the CPEX Logout is complete. It is important to note that the interface limits and wheeling rates entered by the user for the Current Hour, Next-hour, and Future Markets Setup remain in effect after the user has logged out. As a result, a user should not Logout of CPEX while transactions are underway and not before setting the Participant's interface limits in the Future Markets Setup to zero.

Transaction Curtailment

A key feature of CPEX is the enhanced communication it provides participants when transactions must be curtailed. When curtailment is initiated by a Buyer, Seller, or wheeler, CPEX provides the electronic means to immediately and systematically communicate and acknowledge transaction curtailments. Curtailments may be initiated by a Buyer or Seller in the Schedule tab of the Market View or in the Schedule Summary provided upon market closing. Wheelers may initiate curtailment in the Transmission tab of the Transmission View or in the Schedule Summary provided upon market closing. Transactions scheduled for either the Current Hour or the Next Hour may be curtailed. The curtailment of Current Hour transactions affects energy deliveries already in progress, while the curtailment of Next Hour transactions affects transactions already consummated, but not yet underway. Curtailment procedures in CPEX recognize this fundamental difference. Curtailment of Current Hour transactions must communicate curtailment start time, ramp period, and integrated values and requires acknowledgment from both Buyer and Seller. If either Buyer or Seller fails to acknowledge a curtailment, the other party is immediately notified and provided with the information necessary to obtain a verbal acknowledgment. Next Hour transactions require no acknowledgment because, upon market closing, a Next Hour Schedule Summary, which includes the curtailment, is sent to each Participant. However, for a Next Hour transaction curtailed after market closing, a revised Schedule Summary reflecting the curtailment accompanies the curtailment notification.

Figure 37:
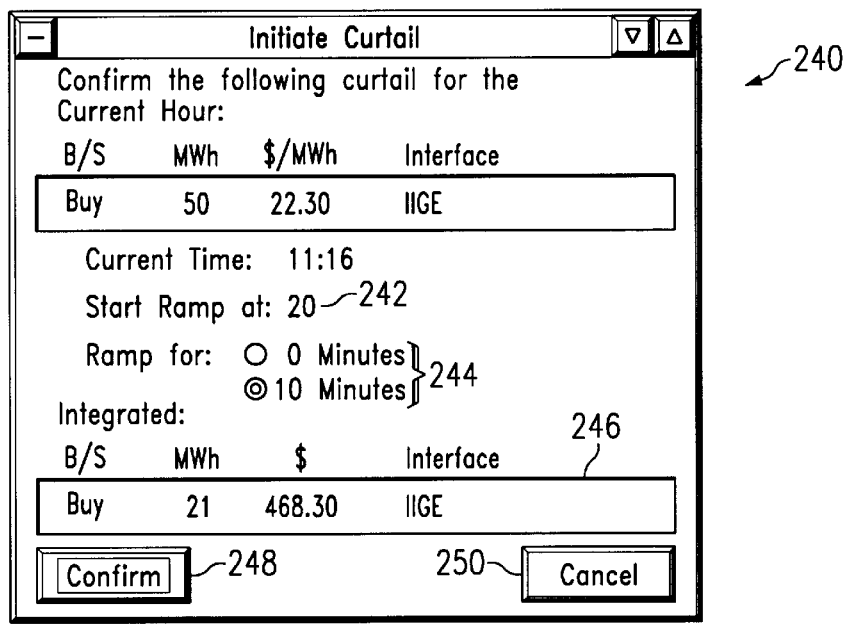

Referring to FIG. 37, a transaction involves a Buyer 230, Seller 232, and two wheelers 234, 236. If the Buyer curtails a current hour transaction, the Buyer would select the either the Schedule tab of the Market View or the Schedule Summary provided upon market closing. The Buyer then selects the Current Hour transaction to be curtailed and presses the Curtail Button 200, shown in FIG. 27. The Initiate Curtail dialogue box 240, shown in FIG. 37, appears. Because the transaction is already underway, the Operator must specify the start time 242 for ramping out the transaction as well as indicate whether the ramp will be accomplished immediately or over 10 minutes 244. The ramp start time defaults to the next minute and the ramp time defaults to 10 minutes. CPEX performs the necessary integration to determine the total energy (MWh) purchased and total cost ($) of that purchase using the designated ramping parameters and displays 246 the results. When completed, the Operator presses the Confirm button 248 and CPEX immediately notifies the other parties to the transaction of the curtailment. If the Operator wishes to discontinue the curtailment, he may press the Cancel button 250 to terminate the curtailment process.

Figure 38:
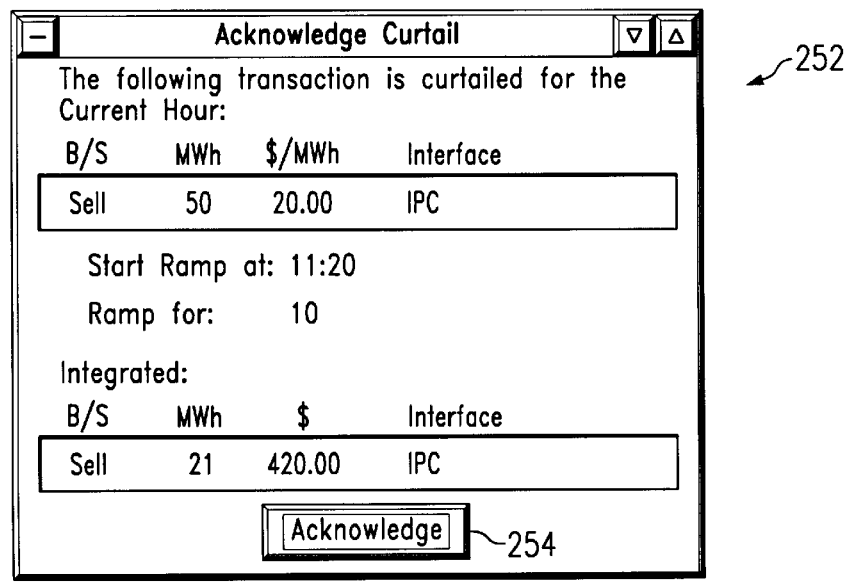
Figure 39:
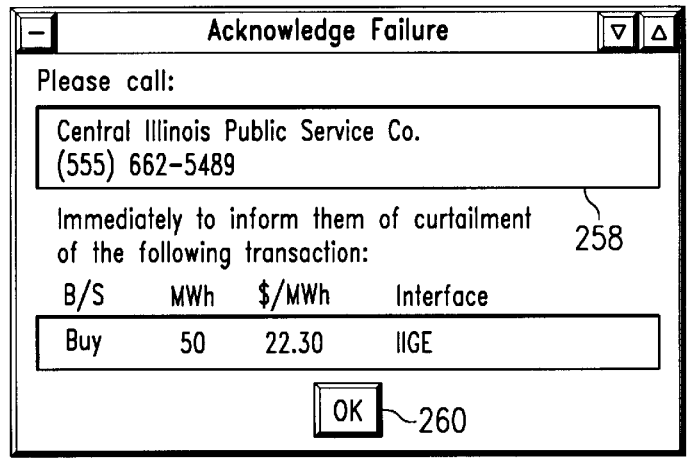

Immediately after the initiator of the curtailment presses the Confirm button, the Seller receives the message 252, shown in FIG. 38. An audible notification accompanies the message. The Seller is notified of the transaction to be curtailed, ramping out parameters, and the integrated quantity of energy (MWh) sold and revenue ($) earned. By pressing the Acknowledge button 254, the Seller confirms the curtailment and makes the necessary changes in its energy management system. The Seller must acknowledge the notification in order for the curtailment procedure to be completed. If the Seller does not acknowledge the curtailment within 40 seconds, the Buyer is immediately notified of the Seller's failure to do so. In doing so, CPEX presents the Buyer with the Acknowledge Failure notification 256, shown in FIG. 39. The Participant name and control center phone number of the Seller who failed to confirm curtailment of the particular transaction is displayed 258 to the Buyer. An audible notification can accompany the message. The Buyer may then contact the Seller by phone to verbally request that he acknowledge the curtailment. Once the curtailment procedure is completed, the Buyer presses the OK button 260 to remove the Acknowledge Failure notification.

Figure 40:
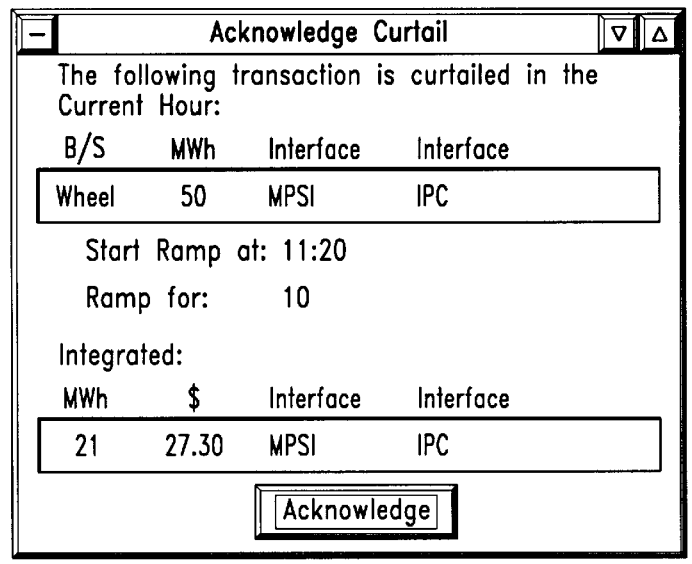
Figure 41:
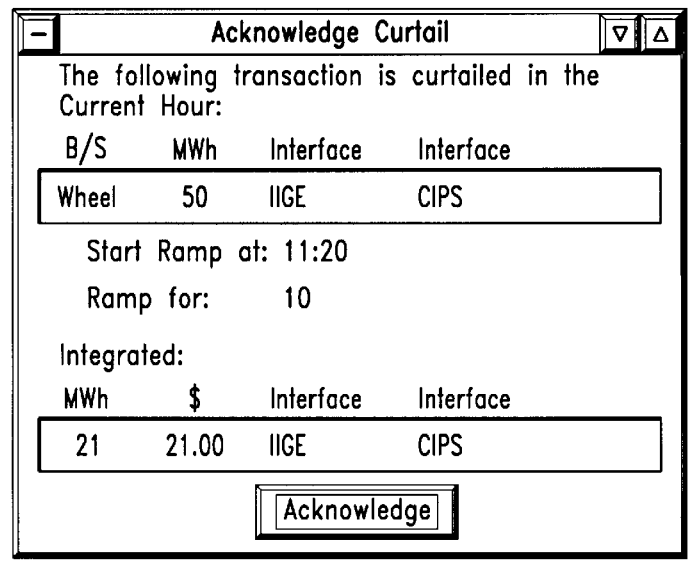

Wheelers 1 and 2 are also immediately notified of the curtailment after the initiator of the Curtailment presses the Confirm button. Wheeler 1 and Wheeler 2 receive the respective Acknowledge Curtail notifications as shown in FIGS. 40 and 41. Audible notification accompanies these messages. Each wheeler is notified of the transaction to be curtailed, ramping out parameters, and the integrated quantity of energy (MWh) wheeled and total wheeling revenue ($) earned. By pressing the Acknowledge button, each wheeler may remove the Acknowledge Curtail notification. Wheelers are not required to acknowledge the notification in order for the curtailment procedure to be completed.

FIG. 42 to illustrate a wheeler initiated curtailment involving two transactions involving two different Buyers, the same Seller, and the same two wheelers. If Wheeler 1 were to experience the loss of the transmission line(s) with Wheeler 2, Wheeler 1 may proceed to curtail all transactions scheduled across that interface. In the Transmission Tab of the Transmission View, shown in FIG. 42, Wheeler 1 selects the Current Hour Market Limit In and Out for the IPC interface, enters zero for both, and presses the Update button 262. Because the updated Market Limit In for the interface is now Zero MW and lower than the total Scheduled Activity 264 of 117 MW, transaction curtailment is necessary. CPEX identifies the transactions scheduled over the interface to be curtailed based on the following list by increasing priority: (1) Interruptible Purchase/Sale Transactions; (2) Wheeling for Interruptible Purchase/Sale Transactions; (3) Wheeling for Non-Interruptible Purchase/Sale Transactions; and finally (4) Non-Interruptible Purchase/Sale Transactions. Within each priority class, transactions are identified for curtailment in chronological order. In other words, the last transaction consummated during the trading hour is the first transaction identified for curtailment.

If a curtailment is required, CPEX identifies the transactions to be curtailed, as shown in the Initiate Curtail dialogue box 266 shown in FIG. 44. In this example, both wheeling transactions scheduled into IIGE from IPC must be curtailed. Because the transactions are already underway, the Operator must specify the start time 268 for ramping out the transactions as well as indicate whether the ramp will be accomplished immediately or over 10 minutes 270. The ramp start time defaults to the next minute and the ramp time defaults to 10 minutes. In this example, the curtailment is being triggered by an equipment outage which has already occurred. The Operator, therefore, may specify an immediate ramp. CPEX performs the necessary integration to determine 272 the total energy (MWh) wheeled and total wheeling revenue ($) earned using the designated ramping parameters. When completed, the Operator presses the Confirm button 274 and CPEX immediately notifies the other parties to the transactions of the curtailments. If the Operator wishes to discontinue the curtailment, he may press the Cancel button to terminate the curtailment process.

Figure 45:
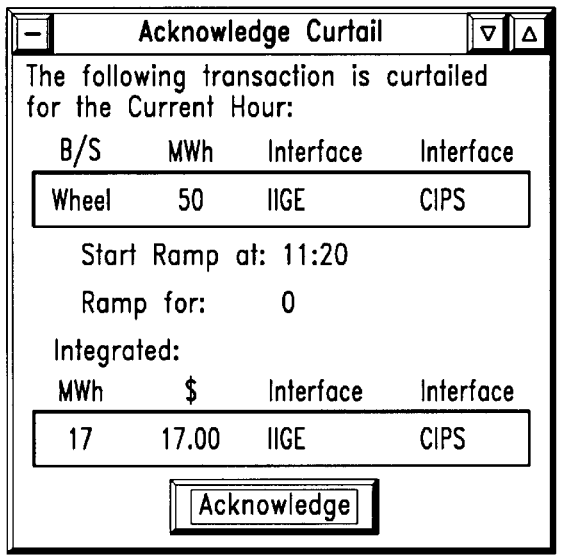
Figure 46:
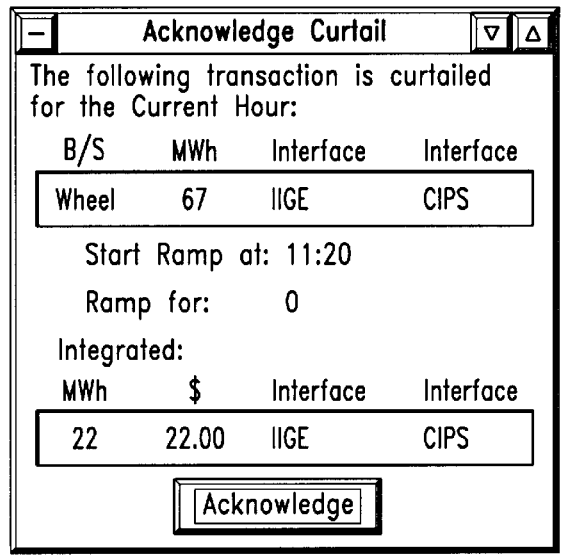

Wheeler 2 is notified of the two curtailments immediately after the curtail initiator presses the Confirm button. Wheeler 2 receives the respective Acknowledge Curtail notifications shown in FIGS. 45 and 46. Audible notification also accompanies the messages. Wheeler 2 is notified of the ramping out parameters and the integrated quantity of energy (MWh) wheeled and total wheeling revenue ($) earned for each curtailed transaction. By pressing the Acknowledge button, the Operator may remove each of the Acknowledge Curtail notifications. Wheelers are not required to acknowledge the notification in order for the curtailment procedure to be completed.

Figure 47:
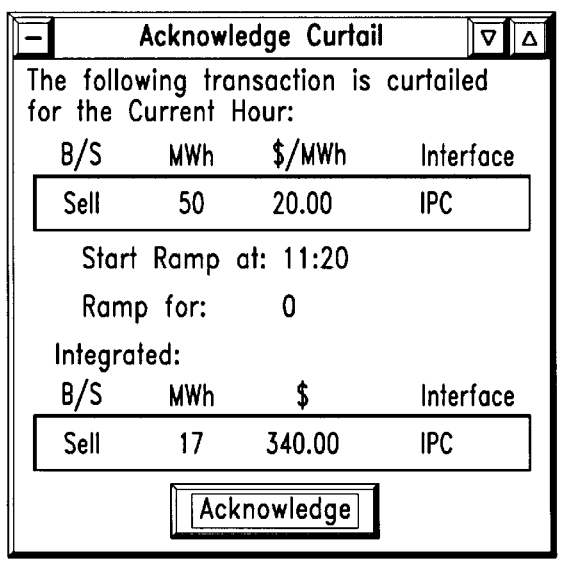
Figure 48:
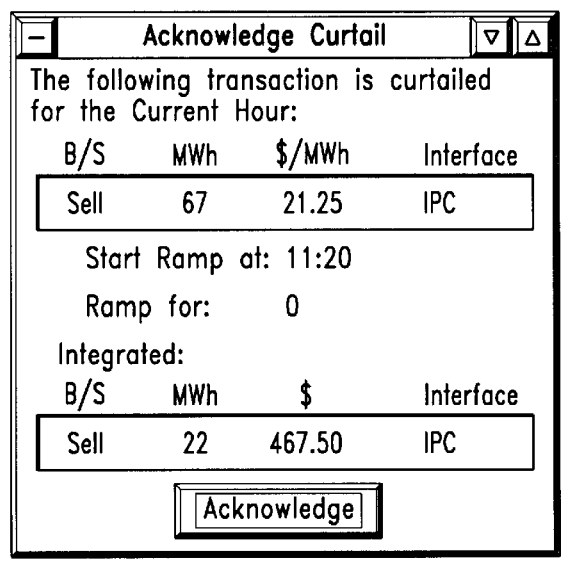

The Seller is also notified of the curtailment immediately after the curtail initiator presses the Confirm button. In this example, two of the Seller's transactions have been curtailed. CPEX provides the Seller with a curtailment notification for each transaction, as shown by the two messages in FIGS. 47 and 48. The Seller is notified of the ramping out parameters and the integrated quantity of energy (MWh) sold and revenue ($) earned for each curtailed transaction. By pressing the Acknowledge button, the Seller confirms each curtailment and makes the necessary changes in his energy management system. The Seller must acknowledge the notifications in order for the curtailment procedure to be completed for each transaction.

The two Buyers are also notified of the curtailments immediately after the curtail initiator presses the Confirm button. CPEX provides each Buyer with a curtailment notification for the transaction to which it is a party, as shown by the two Acknowledge Curtail messages shown in FIGS. 49 and 50. Each Buyer is notified of the ramping out parameters and the integrated quantity of energy (MWh) purchased and cost ($) for each curtailed transaction. By pressing the Acknowledge button, each Buyer confirms the curtailment and makes the necessary changes in its energy management system. Each Buyer must acknowledge its curtailment in order for the curtailment procedure to be completed for each transaction.

If a Seller or Buyer fails to acknowledge a curtailment within 40 seconds, the other party to the transaction is notified. For example, if the Seller fails to acknowledge either of the curtailed transactions with 40 seconds, CPEX presents each Buyer with its respective Acknowledge Failure notification shown in FIGS. 51 and 52. Each Buyer receives notification concerning the transaction to which it is a party. The Participant name and control center phone number of the Seller who failed to confirm curtailment of the particular transaction is displayed to each Buyer. An audible notification accompanies each message. Each Buyer may then contact the Seller by phone to request that it acknowledge each curtailment. Once a curtailment procedure is completed, the Buyer presses the OK button to remove the Acknowledge Failure notification. In a preferred embodiment, both the Seller and Buyer of each transaction must acknowledge curtailment.

FIGS. 53 to 57 illustrate a Buyer/Seller curtailment of next hour transactions. A transaction involves a Buyer 230, Seller 232, and two wheelers 234,236. In the Schedule tab of the Market View, the Buyer selects the Next Hour transaction to be curtailed and presses the Curtail button. The Initiate Curtail dialogue box appears as shown in FIG. 54. Because the transaction is not yet underway, ramping information is not needed from the user. The Operator presses the Confirm button 270 and CPEX immediately notifies the other parties to the transaction of the curtailment. If the Operator wishes to discontinue the curtailment, he may press the Cancel button 272 to terminate the curtailment process. Immediately after the initiator of the curtailment presses the Confirm button, the Seller receives the message 274 shown in FIG. 55. An audible notification accompanies the message. The Seller is notified of the transaction to be curtailed for the Next Hour. Pressing the Acknowledge button removes the Acknowledge Curtail dialogue box and the curtailment procedure is completed. The Schedule Summary sent to the user at market closing reflects the curtailment by excluding the transaction from the schedule. If the curtailment of a Next Hour transaction occurs during the period between market closing and ramping, a revised Schedule Summary reflecting the curtailment is sent to the user immediately following the Acknowledge Curtail message.

Wheelers 1 and 2 are also immediately notified of the curtailment after the initiator of the curtailment presses the Confirm button. Wheeler 1 and Wheeler 2 receive the respective Acknowledge Curtail notifications shown in FIGS. 56 and 57. Audible notification also accompanies these messages. Each wheeler is notified of the transaction to be curtailed and, by pressing the Acknowledge button, may remove the Acknowledge Curtail notification. As with the Seller, Schedule Summaries sent to each wheeler prior to the Next Hour reflect the curtailment and exclude the transaction.

Figures 59, 60, 61:
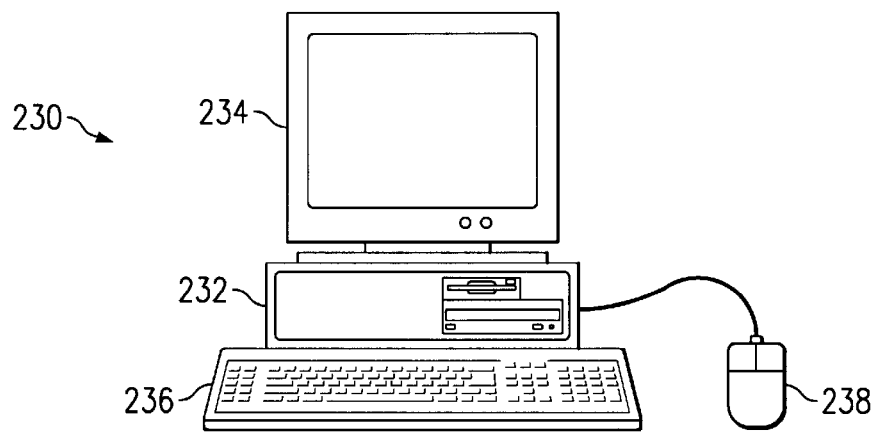

FIGS. 58 to 60 illustrate a next hour curtailment initiated by a wheeler. Two transactions involve two different Buyers, the same Seller, and the same two wheelers. If Wheeler 1 were to experience the loss of the transmission line(s) with Wheeler 2, Wheeler 1 may proceed to curtail all transactions scheduled across that interface in both the Current Hour and Next Hour. In the Transmission Tab of the Transmission View, as shown in FIG. 59, Wheeler 1 selects the Next Hour Market Limit In and Out for the IPC interface, enters zero for both, and presses the Update button 278. Because the updated Market Limit In for the interface is now Zero MW and lower than the total Scheduled Activity 280 of 117 MW, transaction curtailment is necessary. CPEX identifies the transactions scheduled over the interface to be curtailed based on the following list by increasing priority: (1) Interruptible Purchase/Sale Transactions; (2) Wheeling for Interruptible Purchase/Sale Transactions; (3) Wheeling for Non-Interruptible Purchase/Sale Transactions; and finally (4) Non-Interruptible Purchase/Sale Transactions. Within each priority class, transactions are identified for curtailment in chronological order. In other words, the last transaction consummated prior to the interface limit reduction is the first transaction identified for curtailment.

If a curtailment is required, CPEX identifies the transactions to be curtailed, as shown in the initiate Curtail dialogue box in FIG. 60. In this example, both wheeling transactions scheduled into IIGE from IPC must be curtailed. Because the transactions are not yet underway, the Operator need not specify ramping information. The Operator presses the Confirm button and CPEX immediately notifies the other parties to the transactions of the curtailments. If the Operator wishes to discontinue the curtailment, he may press the Cancel button to terminate the curtailment process. Wheeler 2 is notified of the two curtailments immediately after the curtail initiator presses the Confirm button. Wheeler 2 receives the respective Acknowledge Curtail notifications similar to those above. Audible notification also accompanies the messages. Pressing the Acknowledge button removes the Acknowledge Curtail messages. The Schedule Summary sent to the user at market closing reflects the curtailment by excluding the transaction from the schedule. If the curtailment of a Next Hour transaction occurs during the period between market closing and ramping, a revised Schedule Summary reflecting the curtailment is sent to the user immediately following the Acknowledge Curtail message.

The Seller is also notified of the curtailment immediately after the curtail initiator presses the Confirm button. In this example, two of the Seller's transactions have been curtailed. CPEX provides the Seller with a curtailment notification for each transaction. As with the wheelers above, Schedule Summaries sent to the Seller prior to the Next Hour appropriately exclude the curtailed transactions. The two Buyers are also notified of the curtailments immediately after the curtail initiator presses the Confirm button. CPEX provides each Buyer with a curtailment notification for the transaction to which it is a party. Each Buyer may remove the Acknowledge Curtail notification by pressing the Acknowledge button. As with the Seller, Schedule Summaries sent to each Buyer prior to the Next Hour reflect the curtailment and exclude the transaction.

System Hardware

FIG. 61 provides an illustration of the hardware required for the software. Once installed on a general purpose computer 230, the software creates a special purpose machine. A typical configuration consists of a computer 232 having an Intel 486DX 66 Mhz CPU, 8 Megabytes of RAM, a data bus to transport data between the CPU and the memory, a power supply to operate the machine, and a 256-color, SVGA display 234 to view and manipulate the screens discussed above. The computer must also have an Ethernet network card, and a router to allow the connection of a Participant's computer to the CPEX Wide-Area Network and other Participant's computers. A keyboard 236 and mouse 238 can be used to enter data. Local telephone carriers install a dedicated telephone line that connects to the long distance carrier. This combination of equipment enables the dispatchers to log into the CPEX system.

Least Cost Path

Figure 62:
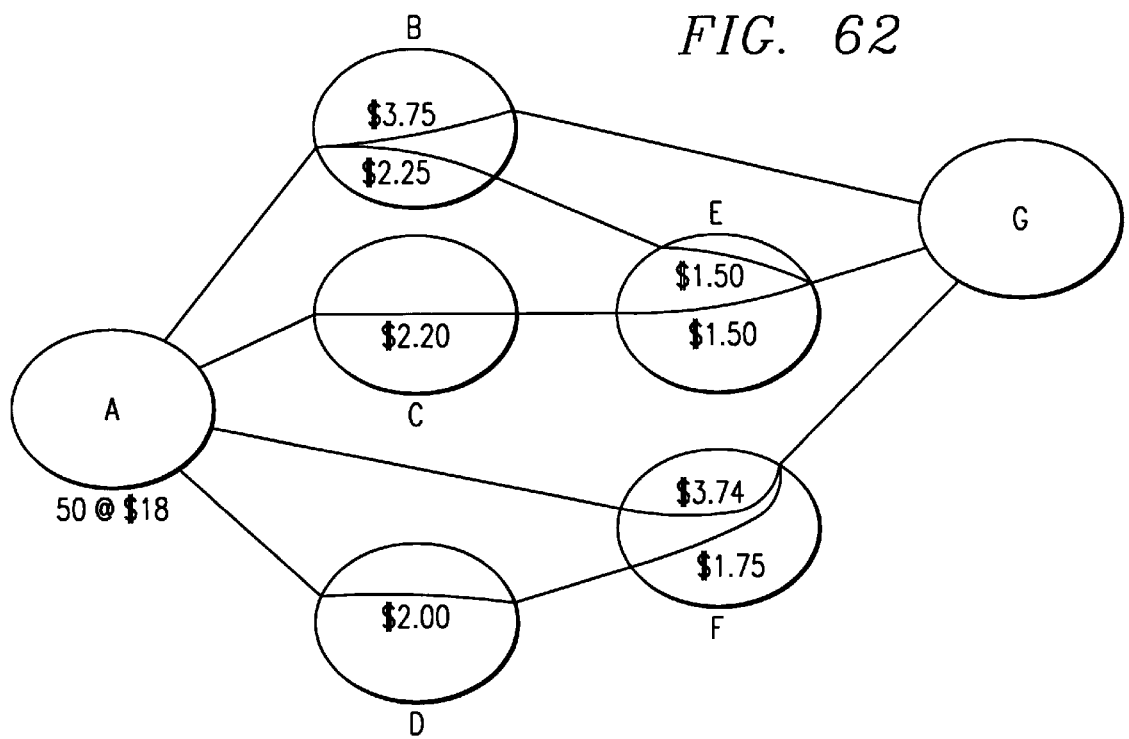
FIGS. 62 and 63 depict data used in the calculation of least cost path.

CPEX calculates the path of least cost from any point A to any other point B using pricing and available capacity information from the database. As transactions are consummated and available transmission capacity is consumed on the least cost path, CPEX presents offers to Participants over alternative paths, in next-best cost order. FIG. 62 provides an example involving seven participants. Participant A floats an offer to sell 50 MWh at $18/MWh. Assuming all paths have at least 50 MW of available transmission capacity, CPEX then calculates the least cost path from A to G. In this example, the least cost path is through C, who adds $2.20 for wheeling, and E, who adds $1.50 for wheeling. The 50 MWh is shown on Participant G's terminal as 50 MWh at $21.70, and scheduled to enter G's system across the interface with Participant E if consummated.

Figure 63:
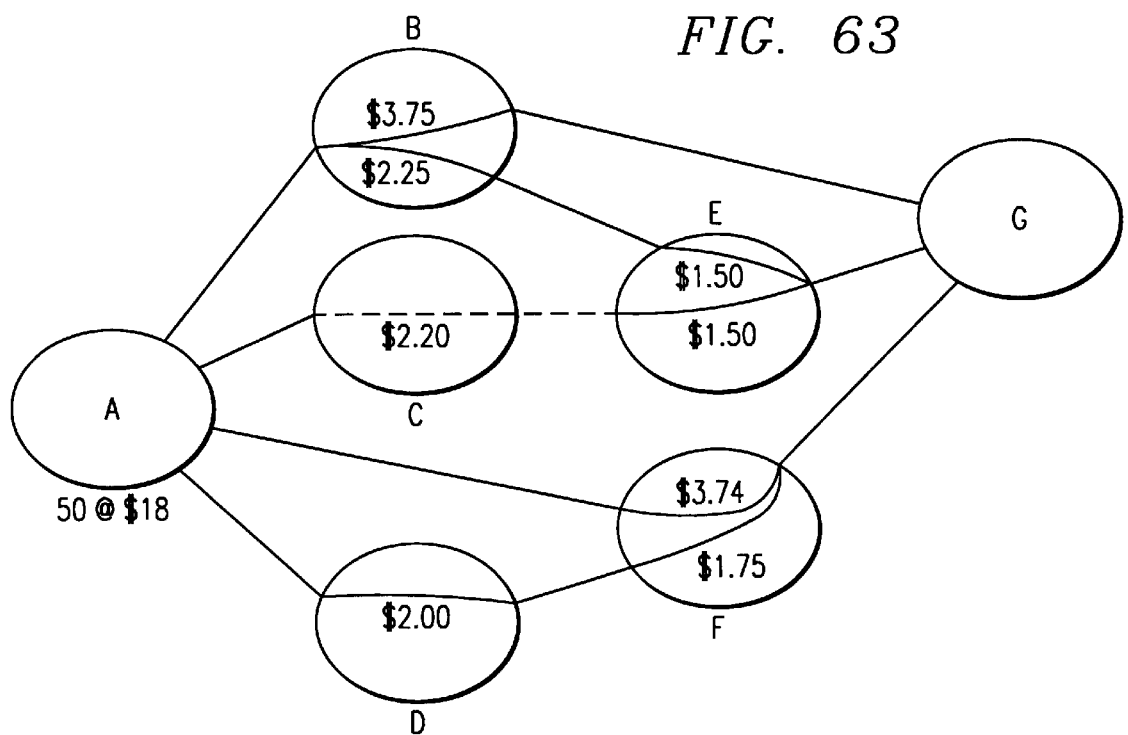

FIG. 63 uses the same pricing as before, with the exception that there is less than 50 MWh of available transmission capacity between C and E. Since this path is not valid for the 50 Mwh sell offer from A to G, CPEX locates the next valid, least cost path. In this example, the sell offer would be presented to Participant G as 50 Mwh at $21.74, and scheduled to be received across G's interface with if consummated. This feature helps ensure the integrity of the electrical grid.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the appended claims.

We claim:

1. A method of selling a quantity of electric energy between at least two participants, said method comprising the steps of:
   (a) connecting a first participant to a database display;
   (b) connecting a second participant to the database display;
   (c) displaying a price for the quantity of electrical energy;
   (d) consummating a transaction between the participants for the quantity of electrical energy; and
   (e) curtailing the transaction between the participants.

2. A method of selling a quantity of electric energy between at least two participants, said method comprising the steps of:
   (a) connecting a first participant to a database display;
   (b) connecting a second participant to the database display;
   (c) displaying a price for the quantity of electrical energy;
   (d) computing a performance index associated with a reliability for either participant; and
   (e) displaying a reliability indicator associated with any offer to sell electric energy.

3. A method of selling a quantity of electric energy between at least two participants, said method comprising the steps of:
   (a) connecting a first participant to a database display;
   (b) connecting a second participant to the database display; and
   (c) displaying a price for the quantity of electrical energy for next hour offers;
   (d) displaying the next hour offers during the current hour; and
   (e) stopping the consummation of next hour transactions at a predetermined time during the current hour.

4. A method for facilitating the trading of units of electrical energy in a data processing system, the method comprising the computer-implemented steps of:
   (a) receiving an offer to buy a quantity of units;
   (b) receiving an offer to sell a quantity of units;
   (c) storing a list of transaction conditions wherein said list comprises:
      (i) a parameter associated with a quantity of units that can be physically delivered wherein said parameter is a limit on an electrical energy unit transmission capacity;
      (ii) a parameter associated with a contractual agreement between at least one or more buyer and seller participants; and
   (d) facilitating a trade transaction for units of electrical energy if transaction conditions are satisfied.

5. The method of claim 4 further comprising:
   (e) curtailing the trade transaction between transaction participants.

6. The method of claim 4 further comprising:
   (e) computing a performance index associated with the trade transaction.

7. The method of claim 6, wherein computing the performance index for the trade transaction is based upon a performance index associated with a buyer, a seller, or a wheeler.

8. The method of claim 7, wherein a performance index for a party to a transaction is based upon historical transaction data.

9. The method of claim 4 further comprising:
   (e) determining a path of delivery of said units through a wheeler for said trade transactions.

10. The method of claim 4 further comprising:
    (e) informing a buyer and a seller of a consummation of the trade transaction.

11. The method of claim 4 further comprising:
    (e) clearing a payment obligation for the trade transaction through an electronic settlement process.

12. The method of claim 4 further comprising:
    (e) informing a buyer and a seller of a scheduling obligation for the trade transaction.

13. The method of claim 4 wherein step (c) (i) is stored if the buyer and seller are at different points.

14. The method of claim 4 wherein step (c) (i) is not stored if buyer and seller are at the same point.

15. The method of claim 4 wherein step (c) (i) is not stored if the units are at the same point.

16. A data processing system for use in facilitating the trading of units of electrical energy in a data processing system, the system comprising:
    (a) means for receiving an offer to buy a quantity of units;
    (b) means for receiving an offer to sell a quantity of units;
    (c) means for storing a list of transaction conditions wherein said list comprises:
       (i) a parameter associated with a quantity of units that can be physically delivered wherein said parameter is a limit on an electrical energy unit transmission capacity;
       (ii) a parameter associated with a contractual agreement between at least one or more buyer and seller participants; and transaction conditions are satisfied.

17. The system of claim 16 further comprising:
    (e) means for curtailing the trade transaction between transaction participants.

18. The system of claim 16 further comprising:
    (e) means for computing a performance index associated with the trade transaction.

19. The system of claim 18, wherein computing the performance index for the trade transaction is based upon a performance index associated with a buyer, a seller, or a wheeler.

20. The system of claim 18, wherein a performance index for a party to a transaction is based upon historical transaction data.

21. The system of claim 16 further comprising:
    (e) means for determining a path of delivery of said units through a wheeler for said trade transactions.

22. The method of claim 16 further comprising:
    (e) means for informing a buyer and a seller of a consummation of the trade transaction.

23. The method of claim 16 further comprising:
    (e) means for clearing a payment obligation for the trade transaction through an electronic settlement process.

24. The method of claim 16 further comprising:
    (e) means for informing a buyer and a seller of a scheduling obligation for the trade transaction.

* * * * *

(12) EX PARTE REEXAMINATION CERTIFICATE (10170th)
United States Patent
Tuck et al.

(10) Number: US 6,115,698 C1
(45) Certificate Issued: May 21, 2014

(54) APPARATUS AND METHOD FOR TRADING ELECTRIC ENERGY

(75) Inventors: David Tuck, Woodstock, GA (US); Bruce Weier, Urbandale, IA (US); John Stojka, Dunwoody, GA (US)

(73) Assignee: Acacia Patent Acquisition LLC, Newport Beach, CA (US)

Reexamination Request:
No. 90/011,295, Oct. 22, 2010

Reexamination Certificate for:
Patent No.: 6,115,698
Issued: Sep. 5, 2000
Appl. No.: 08/516,646
Filed: Aug. 18, 1995

(51) Int. Cl.
*G06F 19/00* (2011.01)
*G06Q 40/04* (2012.01)

(52) U.S. Cl.
CPC .................................... *G06Q 40/04* (2013.01)
USPC ........................................................ 705/37

(58) Field of Classification Search
None
See application file for complete search history.

(56) References Cited

To view the complete listing of prior art documents cited during the proceeding for Reexamination Control Number 90/011,295, please refer to the USPTO's public Patent Application Information Retrieval (PAIR) system under the Display References tab.

*Primary Examiner* — Jeffrey Carlson

(57) ABSTRACT

Electric energy can be traded between connected participants such as utility companies. The present method provides a common marketplace which provides participants the ability to display both buy and sell offers to the other participants. The marketplace also allows the participants to consummate a transaction for a quantity of electrical energy. The method further allows the participants to curtail transactions and the delivery of the electrical energy if necessary.

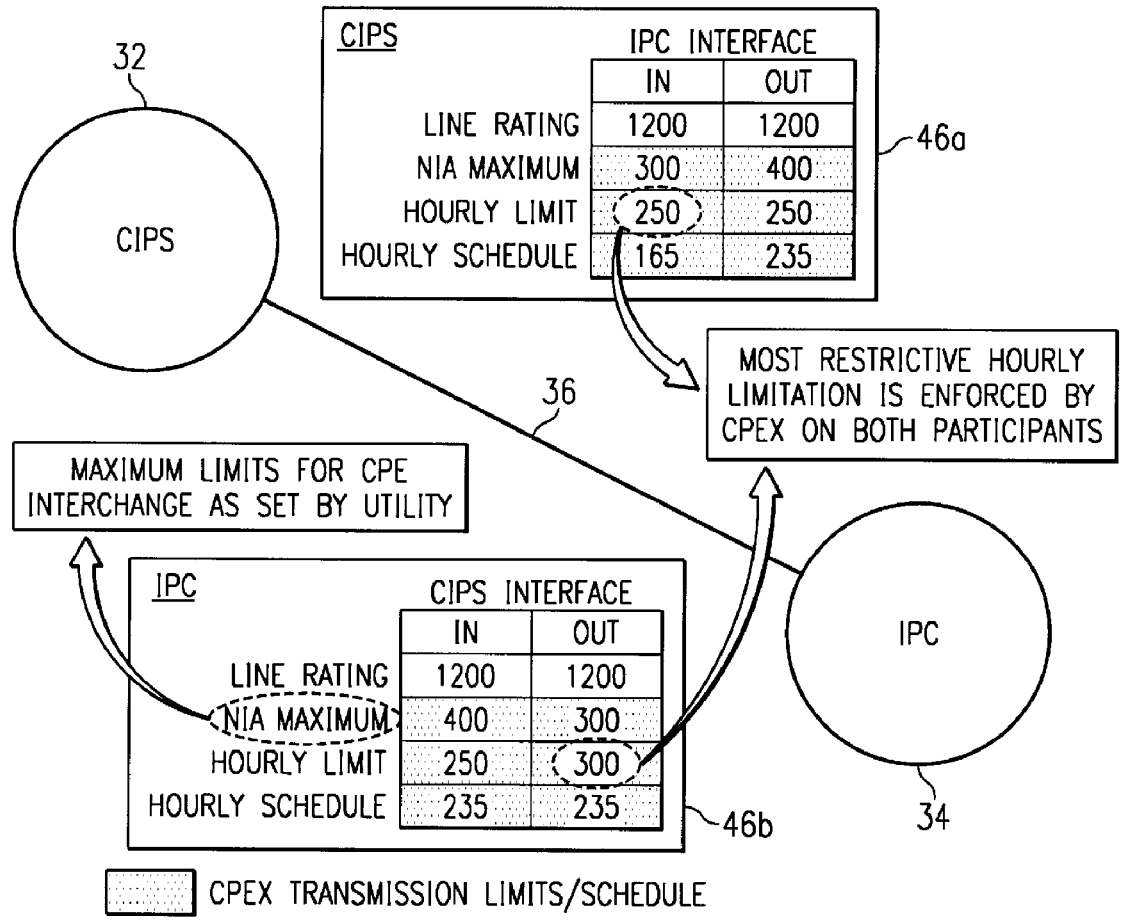

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 2 is confirmed.

Claims 1, 3-24 are cancelled.

New claim 25 is added and determined to be patentable.

*25. A method of selling a quantity of electric energy between at least two participants, said method comprising:*
  *connecting a first participant to a database display;*
  *connecting a second participant to the database display;*
  *displaying a price for the quantity of electrical energy;*
  *computing a performance index associated with a reliability for either participant, wherein the performance index comprises an indication of a tendency of the participant to curtail previous transactions in which it participated; and*
  *displaying a reliability indicator associated with any offer to sell electrical energy.*

\* \* \* \* \*